(12) United States Patent
Cotton et al.

(10) Patent No.: US 12,473,054 B2
(45) Date of Patent: Nov. 18, 2025

(54) SUBMERSIBLE BUOY

(71) Applicant: OCEAN-CAM INC., Gaspé (CA)

(72) Inventors: Dave Cotton, Gaspé (CA); Jacques Dufresne, Gaspé (CA)

(73) Assignee: OCEAN-CAM INC., Gaspé (CA)

( * ) Notice: Subject to any disclaimer, the term of this patent is extended or adjusted under 35 U.S.C. 154(b) by 178 days.

(21) Appl. No.: 18/022,391

(22) PCT Filed: May 26, 2022

(86) PCT No.: PCT/CA2022/050845
§ 371 (c)(1),
(2) Date: Feb. 21, 2023

(87) PCT Pub. No.: WO2022/246563
PCT Pub. Date: Dec. 1, 2022

(65) Prior Publication Data
US 2024/0109622 A1   Apr. 4, 2024

Related U.S. Application Data

(60) Provisional application No. 63/194,363, filed on May 28, 2021.

(51) Int. Cl.
*B63B 22/06* (2006.01)
*B63B 22/18* (2006.01)

(52) U.S. Cl.
CPC ............. *B63B 22/06* (2013.01); *B63B 22/18* (2013.01)

(58) Field of Classification Search
CPC ................................ B63B 22/06; B63B 22/18
See application file for complete search history.

(56) References Cited

U.S. PATENT DOCUMENTS

| 5,007,029 A | 4/1991 | Scott |
| 6,739,924 B1 | 5/2004 | Groen |

(Continued)

FOREIGN PATENT DOCUMENTS

| CA | 2286781 | 10/1998 |
| WO | 91/02676 | 3/1991 |

(Continued)

*Primary Examiner* — Evan P Dzierzynski
(74) *Attorney, Agent, or Firm* — Norton Rose Fulbright Canada LLP

(57) ABSTRACT

A submersible buoy adapted to be attached to a submersible object via a line is disclosed with a central body having a first end and a second end axially spaced apart, the central body adapted to have the line wound therearound. A first and a second floater units are connected to the ends of the central body and have a first buoyancy and a second buoyancy being of a value relative to the first buoyancy such that a total buoyancy force exerted on the submersible buoy, at equilibrium when submerged, is substantially perpendicular to a central axis of the buoy. A line release mechanism includes a line retention device operable between a closed position and a released position, retaining the line to prevent unwinding of the line, and releasing the line to allow the line to unwind, the line release mechanism being operatively linked to a controller unit controllable remotely for remote actuation of the line release mechanism.

18 Claims, 20 Drawing Sheets

(56) References Cited

U.S. PATENT DOCUMENTS

| | | | | |
|---|---|---|---|---|
| 7,175,492 B1* | 2/2007 | Butler | ............ | B63B 22/16 |
| | | | | 441/26 |
| 9,376,185 B2* | 6/2016 | Hawkes | ............ | B65H 75/425 |
| 2017/0332612 A1* | 11/2017 | Partan | ............ | A01K 69/08 |
| 2020/0317301 A1* | 10/2020 | Platè | ............ | B63B 22/02 |

FOREIGN PATENT DOCUMENTS

| | | | | |
|---|---|---|---|---|
| WO | WO-9102676 A1 * | 3/1991 | ............ | B63B 22/06 |
| WO | 2007001191 | 1/2007 | | |

\* cited by examiner

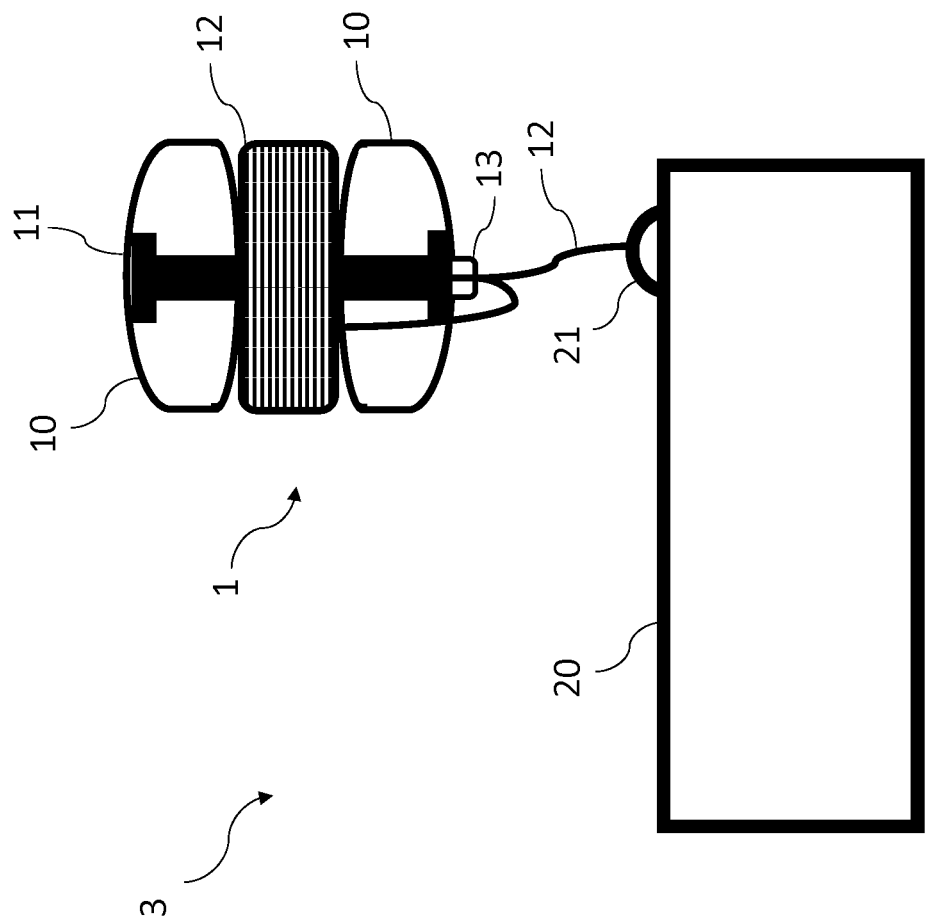

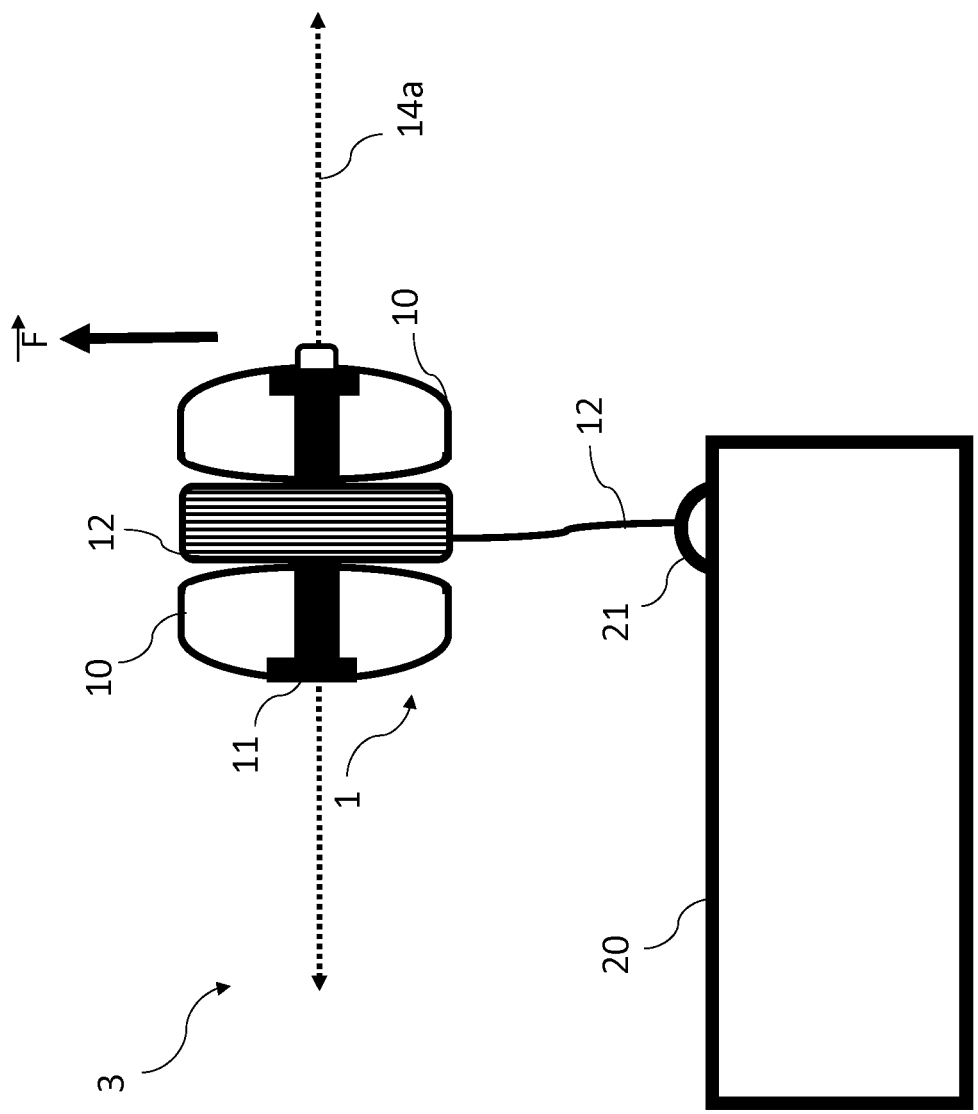

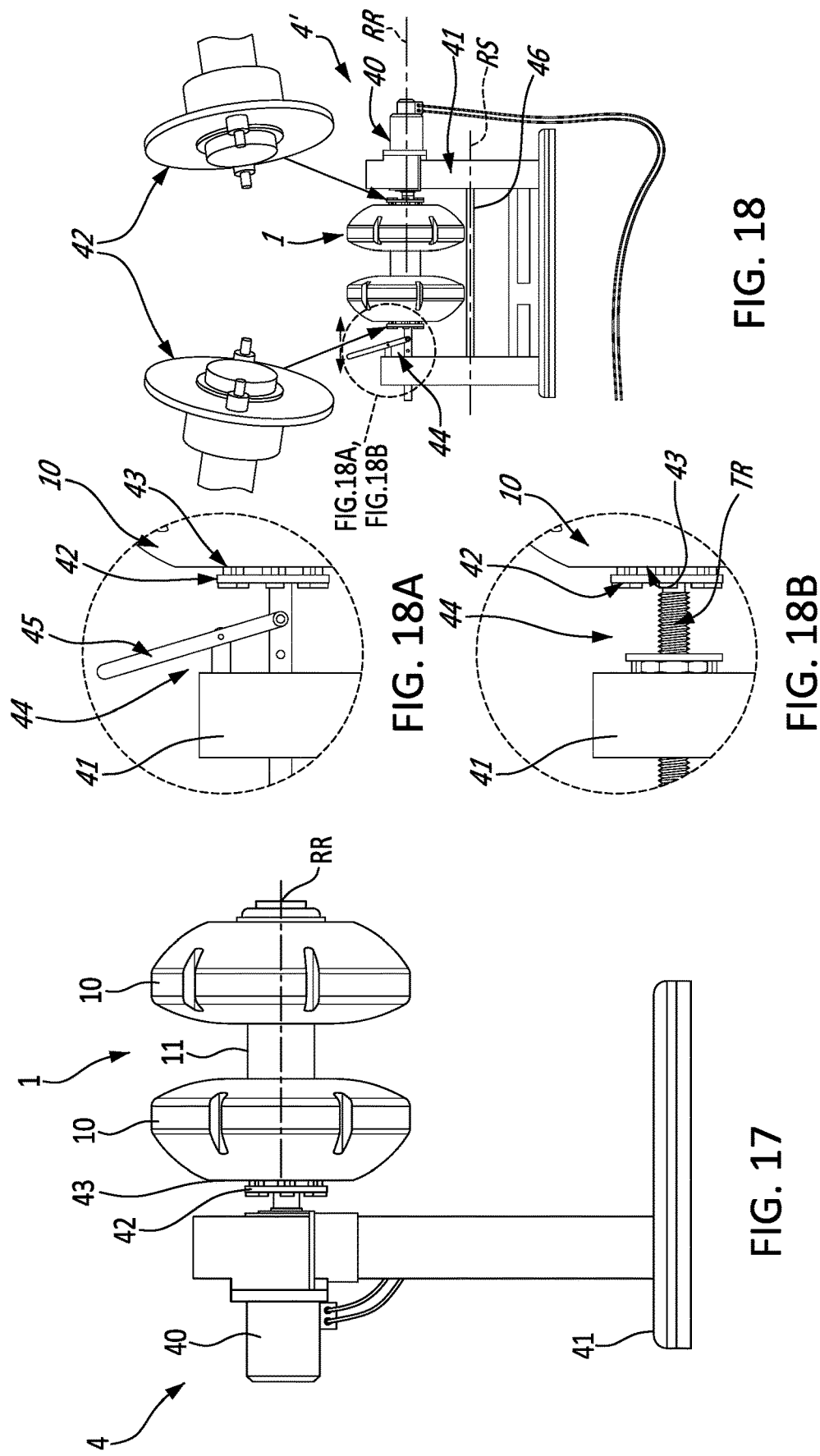

SUBMERSIBLE BUOY

CROSS-REFERENCE TO RELATED APPLICATIONS

This application is a U.S. National Stage Application under 35 U.S.C. 371 of International Application No. PCT/CA2022/050845, filed May 26, 2022, which claims priority on U.S. patent application Ser. No. 63/194,363 filed May 28, 2021, the entire content of which is incorporated herein by reference.

TECHNICAL FIELD

The present disclosure relates generally to buoys, of the type used in fishing operations and/or used to mark a submerged objects such fishing traps, nets and the like.

BACKGROUND

Many maritime operations require a piece of equipment to be submerged for a period of time prior to its retrieval. To facilitate the identification and retrieval of such submerged equipment, a floating buoy is typically attached to the submerged equipment by a cable which runs from the floating buoy all the way down to the submerged equipment. Examples of such submerged equipment include but are not limited to research gear, fishing cages, and fishing nets. Unfortunately, the floating buoy may be a maritime hazard for boat circulation as well as touristic maritime activities. The cable may also be a hazard for large aquatic species such as whales, which can become entangled in the cable thereby causing them harm and compromising the submerged equipment. Improvements in the retrieval of submerged equipment are therefore desired.

SUMMARY

In accordance with a first aspect, there is provided a submersible buoy adapted to be attached to a submersible object via a line, the submersible buoy comprising: a central body having a first end and a second end axially spaced apart along a central axis extending between the first end and the second end, the central body adapted to have the line wound therearound; a first floater unit connected to the first end of the central body and having a first buoyancy; a second floater unit connected to the second end of the central body and having a second buoyancy, the second buoyancy being of a value relative to the first buoyancy such that a total buoyancy force exerted on the submersible buoy, at equilibrium when submerged, is substantially perpendicular to the central axis; and a line release mechanism including a line retention device operable between a closed position and a released position, the line retention device in the closed position retaining the line to prevent unwinding of the line, the line retention device in the released position releasing the line to allow the line to unwind, the line release mechanism being operatively linked to a controller unit, the controller unit controllable remotely for remote actuation of the line release mechanism from the closed position to the released position.

Further in accordance with the first aspect, for example, the submersible buoy further comprising the line, wherein the line is attached to the central body.

Further in accordance with the above aspects, for example, at least a portion of the line is wound around the central body.

Further in accordance with the above aspects, for example, the first floater unit and the second floater unit comprise foam.

Further in accordance with the above aspects, for example, the central body is hollowed and encloses the controller unit.

Further in accordance with the above aspects, for example, the controller unit includes a power source, a processing unit powered by the power source, and a sensor to detect an underwater acoustic signal.

Further in accordance with the above aspects, for example, the controller unit includes a geolocation device.

Further in accordance with the above aspects, for example, the central body has a tubular shape, the central body defining a sealed housing closed by caps at opposite ends thereof.

Further in accordance with the above aspects, for example, at least one of the first floater unit and the second floater unit includes a line retaining slot on a periphery thereof, the liner retaining slot adapted to catch a segment of the line.

Further in accordance with the above aspects, for example, the line release mechanism includes an actuator operatively linked to the controller unit, the actuator connected to the line retention device via a pull rod.

Further in accordance with the above aspects, for example, the actuator includes a solenoid coupled to the pull rod.

Further in accordance with the above aspects, for example, the actuator includes a linear actuator coupled to the pull rod.

Further in accordance with the above aspects, for example, the pull rod is coupled to a ring release of the retention device.

Further in accordance with the above aspects, for example, the pull rod is made of an electrically insulated material.

Further in accordance with the above aspects, for example, the line retention device includes a hook engaging the line in the closed position.

Further in accordance with the above aspects, for example, the hook includes a first hook member movable relative to a second hook member between the closed position and the released position.

Further in accordance with the above aspects, for example, the first floater unit and the second floater unit are spaced apart from each other by a gap along the central body, the gap defined between opposing inner surfaces of the first and second floater units, a ratio of a gap dimension DG over a total width WT of the buoy is between 1:2 and 1:8.

Further in accordance with the above aspects, for example, the ratio of the gap dimension DG over the total width WT of the buoy is about 1:4.

In accordance with a second aspect, there is provided a method of recovering a submerged object attached to the submersible buoy by the line as in the above aspects, the method comprising: mounting the submersible buoy to a reel system on a floating vessel, reeling-in the line attached to the submerged object, and, simultaneously, winding the line onto the central body of the submersible buoy mounted to the reel system.

Further in accordance with the above aspects, for example, mounting the submersible buoy to the reel system includes engaging a mounting interface of the reel system in driving engagement with a motor of the reel system to a corresponding mounting interface on the submersible buoy.

Further in accordance with the above aspects, for example, engaging the mounting interface of the reel system includes engaging male and female portions of the mounting interfaces.

Further in accordance with the above aspects, for example, the mounting interface is a first mounting interface, wherein mounting the submersible buoy to the reel system includes engaging a second mounting interface of the reel system on an opposite side to that of the first mounting interface relative to the submersible buoy, the first mounting interface and the second mounting interface pressing on opposite sides of the submersible buoy in a direction along a rotational axis of the submersible buoy onto the reel system.

In accordance with a third aspect, there is provided a method of releasing a submersible buoy attached to a submersible object via a line wound around the submersible buoy, the method comprising: detecting an underwater acoustic signal generated by a remote controller via a sensor of a controller unit of the submersible buoy; processing the underwater acoustic signal using a processing unit of the controller unit of the submersible buoy operatively linked to the sensor, transmitting a trigger signal from the processing unit to an actuator of a line release mechanism of the submersible buoy, and using the actuator to displace a retention device of the line release mechanism from a closed position to a released position, thereby allowing the line to unwind from the submersible buoy.

Further in accordance with the above aspects, for example, the method comprises emitting a signal indicative of a power level of a power source of the controller unit from the sensor.

Further in accordance with the above aspects, for example, the method comprises emitting a geolocation signal indicative of a geolocation of the submersible buoy for detection by the remote controller.

Further in accordance with the above aspects, for example, the operation of the retention device to the released position includes moving a hook member out of engagement with the line.

Many further features and combinations thereof concerning the present improvements will appear to those skilled in the art following a reading of the instant disclosure.

BRIEF DESCRIPTION OF THE DRAWINGS

FIGS. 1-3 and 6-8 with the line release mechanism of FIGS. 9-10.

FIGS. 15A-15B are schematic side elevation views of the submersible buoy of FIGS. 2-3, shown attached to a submerged object.

FIG. 17 is a side elevation view of the submersible buoy of FIGS. 6-8 mounted to a reel system, adapted to be located on a floating vessel.

FIG. 18 is a side elevation view of the submersible buoy of FIGS. 6-8 mounted to a variant of the reel system shown in FIG. 17.

FIGS. 18A-18B are variants of a clamping mechanism of the reel system of FIG. 18.

DETAILED DESCRIPTION

A submersible buoy for the retrieval of submerged objects is disclosed. The submersible buoy can be used in the fishing industry, for research applications, or even for military applications, where the retrieval of a submerged object is needed. For example, in the fishing industry, the submersible buoy can be used with fishing traps (e.g. crab traps), fishing nets and longline fishing, or other fishing equipment. The submersible buoy of the present disclosure may avoid or limit line blockages during the ascension of the submersible buoy to the water surface. A line blockage could slow down or prevent the submersible buoy from reaching the water surface. The submersible buoy of the present disclosure can be employed at high depth even in the presence of maritime currents. The submersible buoy of the present disclosure may withstand maritime currents at depths of at least 300 m without significantly increasing the risk of line entanglement or blockage during the surfacing of the submersible buoy. This may be at least partially achieved, as will be described in further detail below, due to the configuration and/or features of the present submersible buoy which may allow it to surface, when remotely actuated, in an orientation that reduces the likelihood of the cable or line from becoming entangled.

Figure 1:
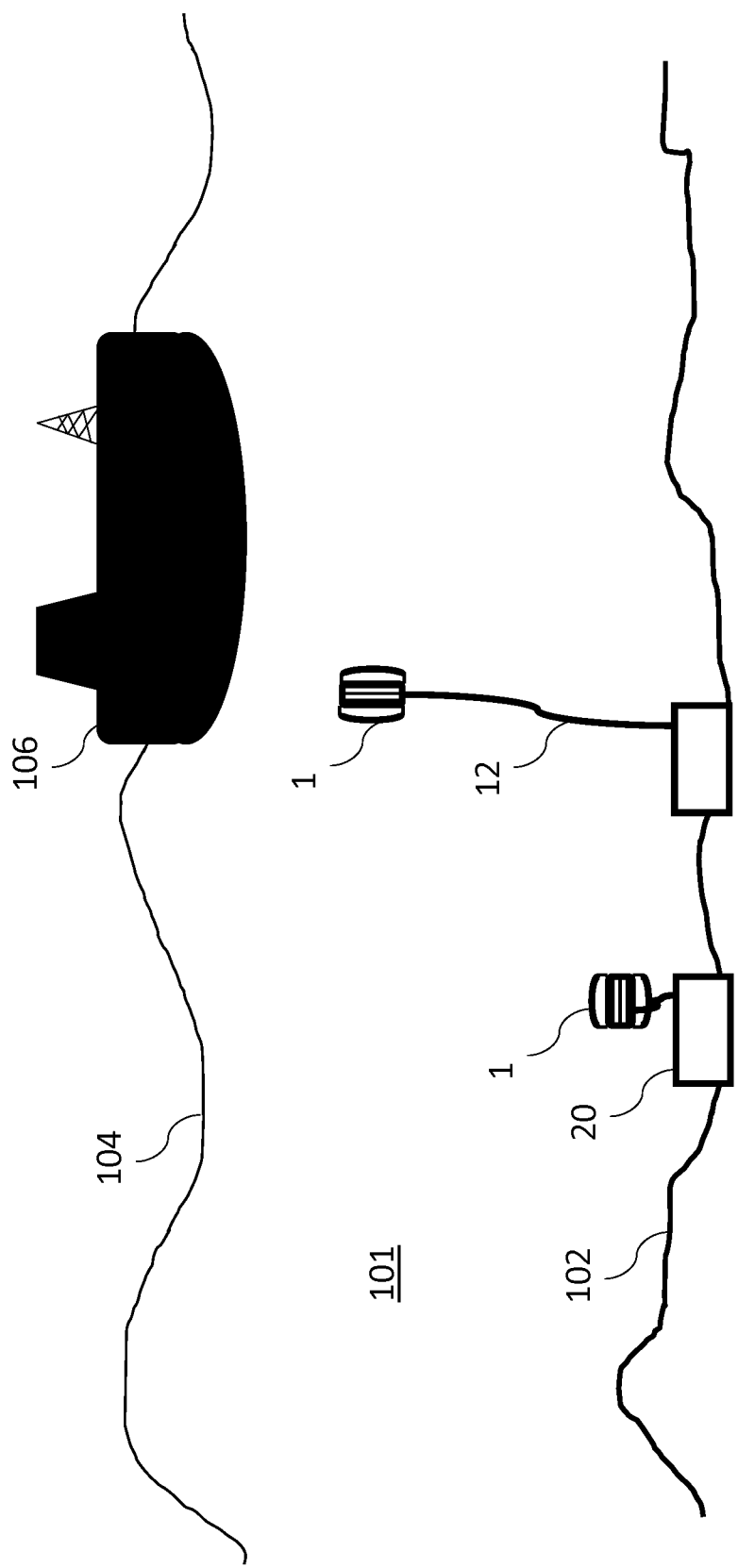
FIG. 1 is a schematic representation of a retrieval of a submersible buoy according to an embodiment.

Referring to FIG. 1, a schematic representation of a retrieval of a submersible buoy 1 is shown. The submersible buoy 1 can be attached to a submerged object 20 via a line 12 and sunk to the floor 102 of a body of water 101 (e.g. ocean, lake, sea and the like). The submerged object 20 may include, for example, research gear, fishing traps, fishing nets, and the like. In some embodiments, the submerged object 20 is a fishing trap, such as a crab or lobster cage use for trapping live crabs or lobsters. The submersible buoy 1 is used for the retrieval of the submerged object 20. In one example, fishermen or other occupants of a boat 106 (or other floating vessel), such as a fishing boat, can submerge the object 20 with the submersible buoy 1 attached thereto. Due to the weight of the object 20, which may be higher than the total buoyancy of the submersible buoy 1 attached thereto, the object 20 and the buoy 1 attached thereto may be submerged and sunk to the floor 102 (, sea floor, ocean floor, or simply bottom floor). A number of objects such as object 20 may be sunk in the water a different locations within a zone (e.g., fishing zone, research zone, etc.) to the floor 102. After a certain period of time, it may be desirable to retrieve the object(s) 20. The boat 106 may sail in the zone, transmit a signal to a line release mechanism 13 (identified in other figures) of the submersible buoy(s) 1 via a signal emitter. The transmitted signal may remotely cause the triggering of the line release mechanism thereby freeing the line 12 and causing the surfacing of the buoy 1 at the surface 104 as shown in FIG. 1. Once the submersible buoy 1 has surfaced, the submersible buoy 1 may be retrieved, manually or by a suitable lifting equipment, for example. With the submersible buoy 1 remaining attached to the submerged object 20, the submerged object 20 may be lifted, and the line 12 may be simultaneously wound onto the buoy 1. A reel system may be used to wind the line 12 onto the buoy 1, as will be described later.

Various configurations of the submersible buoy 1 will now be described with reference to other figures.

Figure 2:
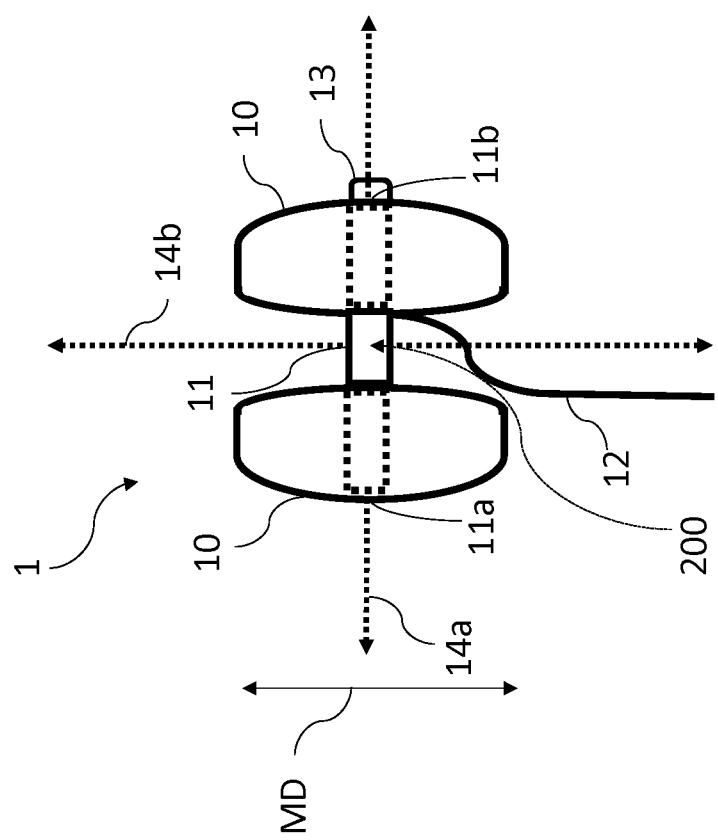
FIG. 2 is a schematic front elevation view of a submersible buoy as illustrated in FIG. 1.
Figure 3:
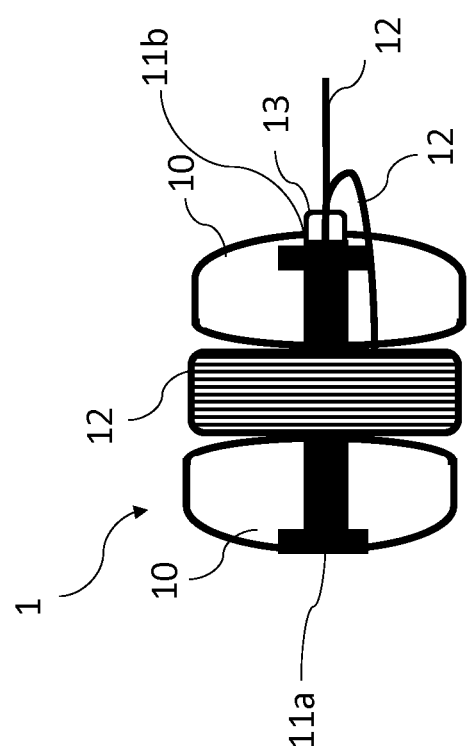
FIG. 3 is a schematic cross—sectional view of the submersible buoy of FIG. 2.

A schematic representation of the submersible buoy 1 is shown at FIGS. 2-3. The submersible buoy 1 includes two floater units 10, which are axially spaced apart along a central axis 14a. The submersible buoy 1 includes a central body 11 extending between the floater units 10. The central body 11 extends along the central axis 14a between a first end 11a and a second end 11b axially spaced apart from the first end 11a. The central body 11 is elongated in a direction aligned with the central axis 14a. The floater units 10 are connected to the central body 11. A first one of the floater units 10 is located at the first end 11a and a second one of the floater units 10 is located at the second end 11b of the central body 11. The floater units 10 and the central body 11 may be secured together geometrically, i.e. by interlocking, with or without adhesive. In such embodiments, the floater units 10 may be disconnectable from the central body 11 for maintenance, cleaning, battery replacement, and/or storage, for example. In some other embodiments, the floater units 10 can be connected to the central body 11 with an adhesive or other known means of attachment suitable for maritime applications.

The central body 11 is hollowed. The central body 11 may house components of a controller unit 200 operatively linked to the line release mechanism 13, and parts of the line release mechanism 13. In at least some embodiments, the central body 11 defines a plurality of sealed compartments. The central body 11 may define a single sealed compartment (or housing) in other embodiments. The central body 11 has a tubular shape. The central body 11 includes a hollowed core portion for enclosing the controller unit 200. The central body 11 may include an annular wall, either part of the core portion or as a second part mounted about the core portion. The annular wall may rotate about the hollowed core portion, in an embodiment. The annular wall 11s may be an annular sleeve 11s (FIG. 6) about the hollowed core portion. Such sleeve may be in sliding engagement with the hollowed core portion (or an intermediary part therebetween). Such "swivel" annular wall may allow the unwinding of the line 12 from the buoy 1 without rotation of the entire buoy 1 about axis 14a. Stated otherwise, the annular wall may be rotatably decoupled from the remainder of the buoy 1. This is only one possibility, as it may be fixed in other cases. The annular wall may be made of plastic or other material resistant to corrosion. The central body 11 is cylindrical in an embodiment. Other tubular shapes may be contemplated, such as square, rectangular, or other polygonal shape, for instance. In embodiments where the central body is cylindrical, the central body 11 may have a uniform diameter or varying diameters. The central body 11 may have a uniform or varying cross-section. In an embodiment, the central body 11 may have a larger diameter at a connection interface with the floater units 10, though this is optional.

As shown, the line 12 extends from the central body 11. The line 12 is secured to the central body 11 in at least some embodiments. The line 12 may be secured to other parts of the buoy 1. For example, the line 12 may be secured to one of the floater units 10 in other embodiments. In the embodiment shown, the floater units 10 have a maximal dimension MD in a direction transverse to the central axis 14a and/or the central body 11. As shown in FIG. 3, the line 12 may be rolled onto the central body 11, between the float units 10. The submersible buoy 1 may be deployed at depths of at least 100 m, at least 150 m, or at least 200 m. Accordingly, in some embodiments, the line 12 may have a length of at least 150 m, at least 200 m, at least 250 m, or at least 300 m. The length of the line 12 may be larger than the depth to account for the angle of ascension in the cases where the submersible buoy does not ascend to the surface straight up to the water surface due to external forces such as currents. In another example, deploying the submersible buoy 1 at a depth of 300 m may require a line that has a length of at least 375 m. Other lengths could be contemplated. The maximal dimension MD of the floater units 10 may be adapted to fit the need of applications at depths of up to 300 m or more, hence a desired length of line 12 that is equal to or longer than the depth. Line gauge/thickness and axial space between the floater units 10 may thus affect design or working parameters of the buoy 1 in various embodiments.

The line 12 may be any suitable line for deep maritime applications, such as a cord or a cable. For example, the line 12 can be a nylon, polypropylene, and/or polyester rope or a stainless steel cable. The line 12 may have a thickness of at least 15 mm, for example between 15 mm and 20 mm or between 16 mm and 19 mm. In one particular example, the line 12 has a thickness of 17 mm. The thickness of the line 12 may be particularly important in applications where the submerged object 20 is dense and voluminous. For example, in the case of crab fishing with traps, the submerged object 20 may be a plurality of connected traps. A line with a thickness/diameter of about 17 mm (±3 mm) may be required by industry standards for some applications.

The floater units 10 are configured such that their respective associated fluid displacement (or relative upthrust) provide a buoyancy value relative to the other wherein a total buoyancy force exerted on the submersible buoy 1, at equilibrium when submerged, is substantially perpendicular to the central axis 14a. The term "at equilibrium when submerged" as used herein means that the submersible buoy 1 is submerged (for example at a depth of at least 10 m) and the forces significantly acting on the submersible buoy 1 are the buoyancy and gravity in opposite directions. In some embodiments, the floater units 10 are configured such that they each provide substantially equal (±5%) buoyancy at each lateral side of the submersible buoy 1. The lateral sides of the submersible buoy 1 may be defined as respective portions of the buoy 1 on opposite sides of a central plane 14b that is perpendicular to the central axis 14a and bisects the central body 11 (see FIG. 2). This may be achieved by making the floater units 10 equal in size and/or shape, made of similar materials or having different materials but with equivalent buoyancies (i.e. equivalent volume and density), etc. In an embodiment, this may result in having a center of buoyancy of the submersible buoy 1 symmetrically located between the floater units 10. The center of buoyancy may be aligned with the axis 14a and/or central body 11 in some cases.

The two axially spaced apart floater units 10 may provide substantially equal buoyancy when the submersible buoy 1 is submerged and/or a total buoyancy, such that at equilibrium, the submersible buoy 1 may tend to rise to the surface of the water with its axis 14a remaining substantially horizontal (±15 degrees), e.g., in the position as shown in FIG. 2, and substantially perpendicular (±15 degrees) to the central plane 14b. Stated otherwise, the central body 11, and central axis 14a may remain normally oriented (or quasi-normally) relative to the buoyancy and/or gravity as the submersible buoy 1 rises to the water surface 104. In some embodiments, the central plane 14b is substantially perpendicular(±15 degrees) to the surface of the water and/or to the bottom surface or floor 102 of the body of water when the submersible buoy 1 is submerged at equilibrium. Accordingly, in some embodiments, the central axis 14a is substantially parallel (±15 degrees) to the surface of the water 104 and to the floor 102 of the body of water. It should be understood that such "theoretical" orientation relative to the surface 104 and/or the bottom floor 102 is for illustration purpose only. Uneven floor 102 may exist, and the presence of waves and/or water current may also affect dynamically the orientation of the central axis 14a as the submersible buoy 1 is being rising to the surface 104. In some embodiments, a distribution of the mass of the submersible buoyancy and/or fluid displacement may not be symmetrical relative to the central plane 14b. This may result in having an unequal buoyancy associated with the respective floater units 10. In such cases the floater units 10 may have different buoyancies to counter balance the asymmetrical mass distribution and/or fluid displacement such that the overall buoyancy acting on the submersible buoy 1 may still be substantially perpendicular (±15 degrees) to the central axis 14a at equilibrium when submerged.

In at least some embodiments, the buoyancy contribution of the two floater units 10 may be significantly more than the buoyancy of the remaining components of the submersible buoy 1 (e.g. the central body 11, the line 12, other components of the submersible buoy 1 described herein) with respect to the total buoyancy of the submersible buoy 1. For instance, the buoyancy contribution of the two floater units 10 may be greater than 95% of the total buoyancy of the submersible buoy 1. In such embodiments, the buoyancy of the components of the submersible buoy 1 other than the floater units 10 may be of low impact even if the buoyancy/mass distribution of these other components is not symmetrical relative to the central plane 14b, along the central axis 14a. Accordingly, in such embodiments, the floaters units 10 may have substantially (±5%) the same buoyancy properties, for example volume and/or density, despite the uneven distribution of buoyancy or mass of the other components on either side of the central plane 14b.

Figure 5:
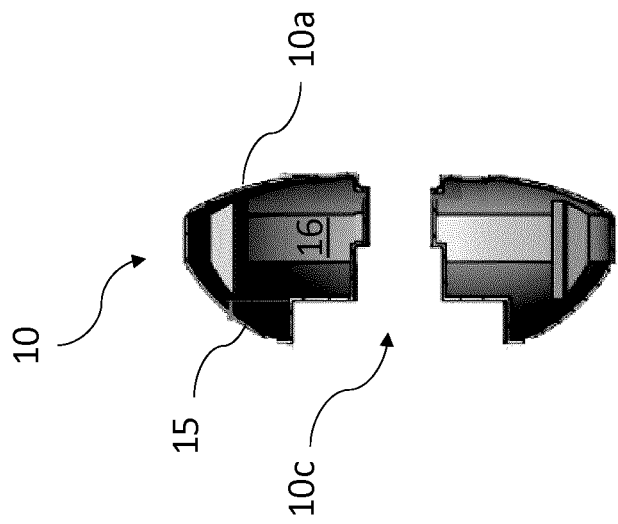
FIG. 5 is a cross-sectional view of a floater unit according to an embodiment of the present disclosure.
Figure 4:
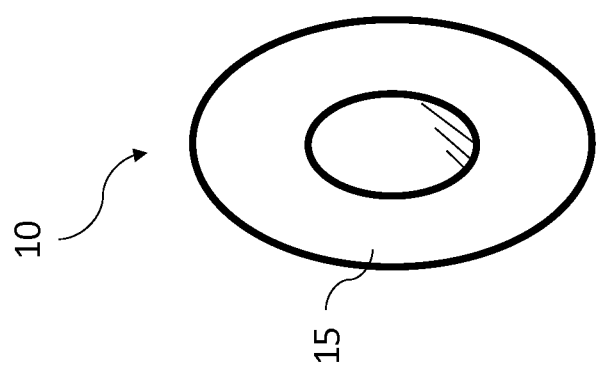
FIG. 4 is a schematic side elevation view of a floater unit according to an embodiment of the present disclosure.

FIGS. 4-5 show a floater unit 10 of the submersible buoy 1. The floater unit 10 may have a floating material 15 housed inside the floater unit 10, or the floater unit 10 may be composed entirely of the floating material 15. Examples of floating materials include but are not limited to high density foams. In an embodiment, the floating material 15 comprises a high density foam. In the embodiment shown, the floater unit 10 has a hollowed shell 10a. The shell 10a defines an internal volume of cavity 16. The cavity 16 may be partially or entirely filled with the floating material 15. The shell 10a may be part of the floating material 15. For example, the floating material 15 may include a solid shell (e.g. made of low density polyethelyne/high density polyethylene) enclosing the high density foam. The floating material 15, in some embodiments, has a minimum lost buoyancy at a depth of 500 m (or a pressure of 22 atm/700 Psi or equivalent). The shell 10a may be molded, such as by rotomolding, injection-molding, or other molding techniques. In some embodiments, the cavity 16 may be air tight. The cavity 16 may contain air and/or other gas fluids. Air and/or gas fluids could be at ambient pressure (sea level pressure) or pressurized, for example. Pressurizing the cavity 16 may assist in maintaining the structural integrity of the shell 10a when submerged. Pressure inside the cavity 16 could oppose to the pressure of the water when the floater unit 10 is submerged. In some embodiments, the shell 10a may be rigid enough to oppose to the pressure of the water when the floater unit 10 is submerged at a predetermined depth, without pressurizing the cavity 16.

As shown, in an embodiment, the floater unit 10 includes an opening 10c. The opening 10c may be aligned with the central axis 14a. As such, the opening 10c may be referred to as the central opening 10c. The opening 10c may receive part of the central body 11, at ends 11a, 11b of the central body 11. In the embodiment shown, the shell 10a defines the opening 10c. Stated otherwise, the floater unit 10 may be annular. The shell 10a and/or the cavity 16 extend(s) about the opening 10c. As shown in the cross-section of FIG. 5, the opening 16 may extend all the way through the floater unit 10. In the depicted embodiment, the opening 10c defines a countersunk hole. The countersunk hole may axially engage with a respective end 11a, 11 b of the central body 11 (or vice versa). The countersunk hole defines a shoulder. The outwardmost section of the countersunk hole from the shoulder and ending at an end of the floater unit 10 may receive a seal, plug or cap in sealing engagement with the central body 11, or components of the line release mechanism 13, as will be described later hereinbelow.

Figure 6:
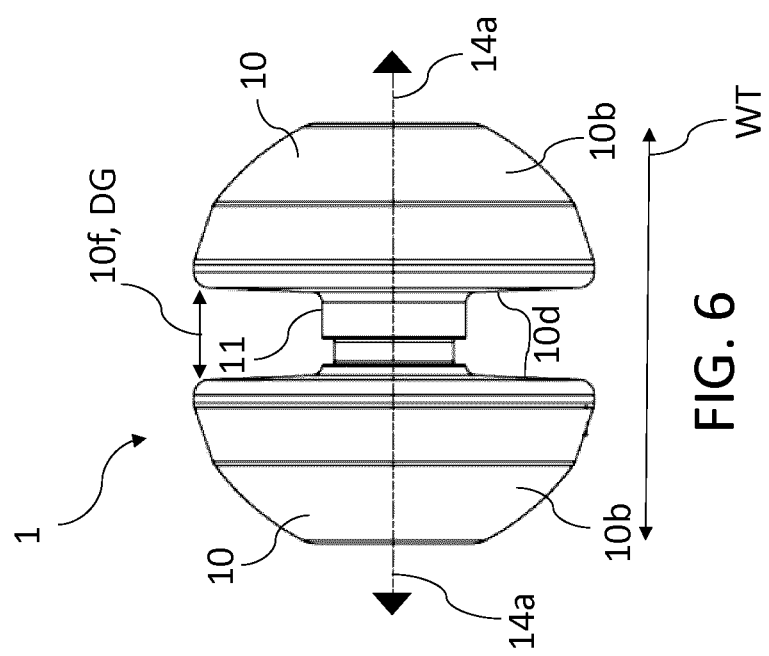
FIG. 6 is a front elevation view of an exemplary submersible buoy as in FIGS. 2-3.
Figure 7:
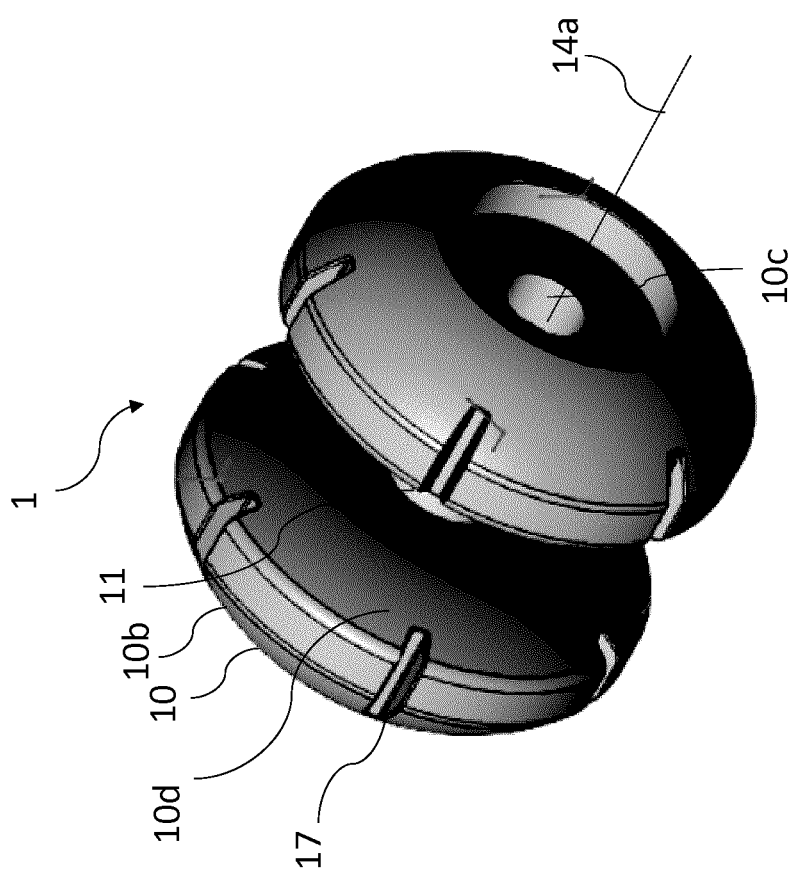
FIG. 7 is a perspective view of the submersible buoy of FIG. 6.

Referring to FIGS. 6-7, the floater units 10 have an outer surface 10b which faces outwardly from the buoy 1, and/or away from the central plane 14b. In the embodiment shown, the outer surface 10b defines a generally hemispherical shape. The maximal dimension MD of the float units 10 in the direction transverse to the central axis 14a decreases in an outward direction (direction away from the central plane 14b of the buoy 1). The oppositely facing ends of the floater units 10 are straight when viewed in the front elevation view of FIG. 6. As can be seen in FIG. 7, the ends of the floater units 10 define the openings 10c (discussed above), here the countersunk hole as discussed above. The outer surface 10b with a convex shape may increase the hydrodynamic stability of the submersible buoy, for instance in the presence of maritime currents. In embodiments where the outer surface 10b of the floater unit 10 is convex, the submersible buoy 1 may better resist rotating out of its equilibrium ascension in response to a maritime current. The term "equilibrium ascension" as used herein refers to the ascension of the submersible buoy 1 under controlled conditions of equilibrium when submerged as previously described. In other words the equilibrium ascension may be defined as a linear or straight ascension. In some cases, in the presence of external forces, as is the case in ocean and sea deployments of the submersible buoy 1, the submersible buoy 1 may not follow the "equilibrium ascension" path considered to be substantially perpendicular to the surface of the water. While the outer surface 10b has an hemispherical shape or frustum of a sphere (slice of a sphere), other shapes may be contemplated, such as conical, frustroconical, pyramidal, frustum of a pyramid, torus, cylindrical, for example.

As shown in FIG. 6, the floater units 10 have an inner surface 10d which faces towards the central plane 14b of the buoy 1. The outer surface 10b of the floater unit 10 is opposite to the inner surface 10d. The inner surface 10d of each one of the floater units 10 face each other. Stated otherwise, the inner surface 10d of the first one of the floater unit 10 faces a corresponding inner surface 10d of the second one of the floater units 10. The inner surface 10d are axially spaced apart along the central axis 14a. A space or gap 10f is defined between the inner surface 10d. Such gap 10f may receive the line 12 rolled onto the central body 11. Stated otherwise, the inner surface 10d of the floater units 10 define side walls of the gap 10f which receives the rolled line 12. The inner surface 10d may therefore contact the line 12 during the winding or the unwinding. It may be desirable to limit the dimension DG (width) of the gap 10f between the inner surface 10d of the respective floater units 10 to prevent or at least limit oscillations of the buoy 1 while the line 12 is unwinding from the central body 11 as the buoy 1 ascends to the surface. As the line 12 unwinds from the central body 11 during ascension of the buoy 1, the unwinding may induce oscillations. The amplitude of such oscillations may be proportionate to the dimension DG of the gap 10f. Minimizing the dimension DG may limit the amplitude of the oscillations, which may better control the unwinding and/or limit the propensity of entangling of the buoy 1 with the line 12. In at least some embodiments, a ratio of the dimension DG over the total width WT of the buoy 1 (end-to-end) is between 1:2 and 1:8. In a particular embodiment, the ratio is about 1:4 (±10%). In another particular embodiment, such ratio is 1:6.

The inner surfaces 10d are smooth (i.e., free of bumps, protrusions, ribs, not jagged, etc.). This may be more appropriate in at least some embodiments, to limit jamming or friction with the line 12. However, a person skilled in the art would appreciate that with repeated usage, the inner surface 10d may develop minor protrusions and irregularities. In an embodiment, the inner surfaces 10d are generally flat. The inner surfaces 10d may be curved in some embodiments. For instance, in an embodiment, the inner surfaces 10d are convex. In some embodiments, the inner surfaces 10d may be partially flat and/or partially convex. This can be seen in FIG. 5, where a first segment of the inner surface 10d extending from the opening 10c is flat, and where an adjacent second segment of the inner surface 10d is chamfered or flared (at angle) with respect to the first segment. Having a chamfered or flared segment at a radially outwardmost segment of the inner surface 10d, as the segment may facilitate the unwinding of the line 12 and/or allow a smoother unwinding of the line 12. The inner surfaces 10d of the floater units 10 have the same outline in FIGS. 6-7. The inner surfaces 10d of the floater units 10 may have a different outline in other cases.

In some embodiments, the inner surface 10d can be treated or coated with a material which prevents or limits sea life attaching on the inner surface 10d. In an embodiment, the inner surface 10d has a surface treatment, which may include an antifouling coating, though this is optional.

Other shapes are contemplated, for example the submersible buoy 1 may have a convex inner surface and a convex outer surface. The geometry of the submersible buoy 1 may be adapted depending on the depth the submersible buoy is going to be deployed at. The geometry may also be adapted based on the aquatic environment where the submersible buoy 1 will be deployed. For example, the width and diameter of the floater unit 10 may be selected based on an intended deployment depth. The dimensions of the floater unit 10 may be larger for floater unit 10 intended for deeper sinking than the dimensions of floater units 10 for shallower water. The term "width" or "W" as used herein in the context of a floater unit 10 refers to the size of a floater unit 10 along the central axis 14a. The terms "transverse dimension", "diameter" or "$D_F$" as used herein in the context of a floater unit 10, and unless specified otherwise, refer to the diameter or transverse dimension of the floater unit 10 extending along the inner surface 10d of the floater unit 10. In embodiments, where the inner surface 10d is convex, the diameter at the inner surface 10d may be the largest diameter.

The central body 11 has a longitudinal dimension or length "L" extending along the central axis 14a from the first floater unit 10 to the second floater unit 10. The central body 11 also has a transverse dimension or diameter "$D_{CB}$" that may be defined as the largest transverse dimension along the central body 11. In some embodiments, the floater unit 10 has a ratio of the width W of the floater unit 10 to the length L of the central body 11 (W/L), of at least 1.5, at least 1.6, at least 1.7 or at least 1.8. In further embodiments, the ratio W/L may be between 1.5 and 3, between 1.7 and 2.5, or between 1.9 and 2.2. In some additional embodiments, a ratio of the diameter $D_F$ of the floater unit to the diameter $D_{CB}$ of the central body ($D_F/D_{CB}$) is at least 2.8, at least 2.9, at least 3, at least 3.1, at least 3.2. In further embodiments, the ratio $D_F/D_{CB}$ is between 2.8 to 6, between 2.9 to 5.5, between 3 and 5. In yet additional embodiments, a ratio of the diameter of the floater unit to the length of the central body ($D_F/L$) is between 1.5 and 7, between 1.7 and 6.5, or between 2 and 6. These ratio are only some possibilities.

Figure 8:
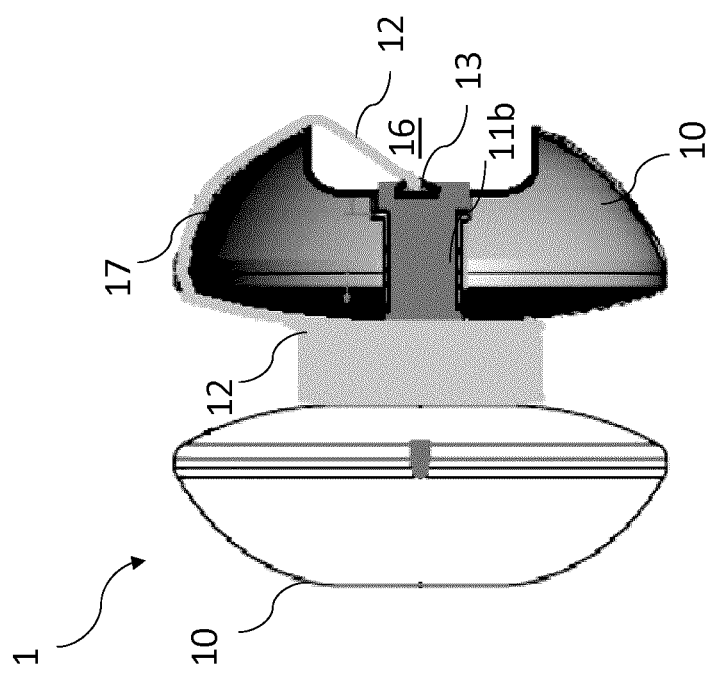
FIG. 8 is a partially-sectioned front elevation view of the schematic submersible buoy of FIGS. 6-7, shown with a rolled line.

Also shown in FIG. 7, in at least some embodiments, the floater units 10 (either one or both) include a line retaining slot 17 on a periphery of the floater units 10. As shown, a plurality of line retaining slots 17 are located on the floater units 10. The line retaining slots 17 extends from the inner surface 10d to the outer surface 10b of the float units 10. The line retaining slots 17 extends in a direction aligned with the central axis 14a and/or in the same direction as the longitudinal extent of the central body 11. The line retaining slots 17 are peripherally spaced apart at a circumference/periphery of the float units 10. In the embodiment shown, the line retaining slots 17 are defined by the shell 10a of the floater units 10. As shown in FIG. 8, the line retaining slots 17 may catch the line 12. The line 12 in one of the line retaining slot 17 may engage in the slot 17 and be longitudinally trapped. The liner retainer slot 17 may prevent the line 12 from unwinding from the central body 11 when the line 12 is captive/tethered within the line release mechanism 13. The slots 17 have a finite depth. The depth may be minimized (e.g. not deeper than 75%±25% of the maximal transverse dimension of the line 12). In an embodiment, the slots 17 have a tapered shape (radially inwardly narrower). Stated otherwise, the side walls of the slots 17 may taper towards the central axis 14a. The slots may have a constant width in other embodiments. The slots 17 may have a minimum width that is smaller than the thickness/diameter of the line 12 in a non deformed state. When a force is applied onto the line 12 towards the bottom of the slot 17, the line 12 may deform and get squeezed/jammed in the slot 17. The orientation, number, size and/or distribution of the line retaining slots 17 may be different in other embodiments. For example, there may be a single slot 17, or more than as shown. The slot(s) 17 may extend at angle relative to the central axis 14a in other embodiments. Friction between the slot walls and the line 12 may contribute to the retention of the line 12 as well.

As shown in FIGS. 7 and 8, at least a portion of the line 12 may be wound around the central body 11. As can be seen in FIG. 8, the line release mechanism 13 is in the closed position with the line 12 captive/tethered by the line release mechanism 13. In the rolled configuration, a segment of the line 12 between the wound length and the line release mechanism 13 extends in one of the line retaining slots 17. Engaging the line 12 in one of the slots 17 as shown may limit the risk of undesired/unintended unrolling of the line 12 when the buoy 1 is sunk or when the buoy 1 is manipulated.

Figure 9:
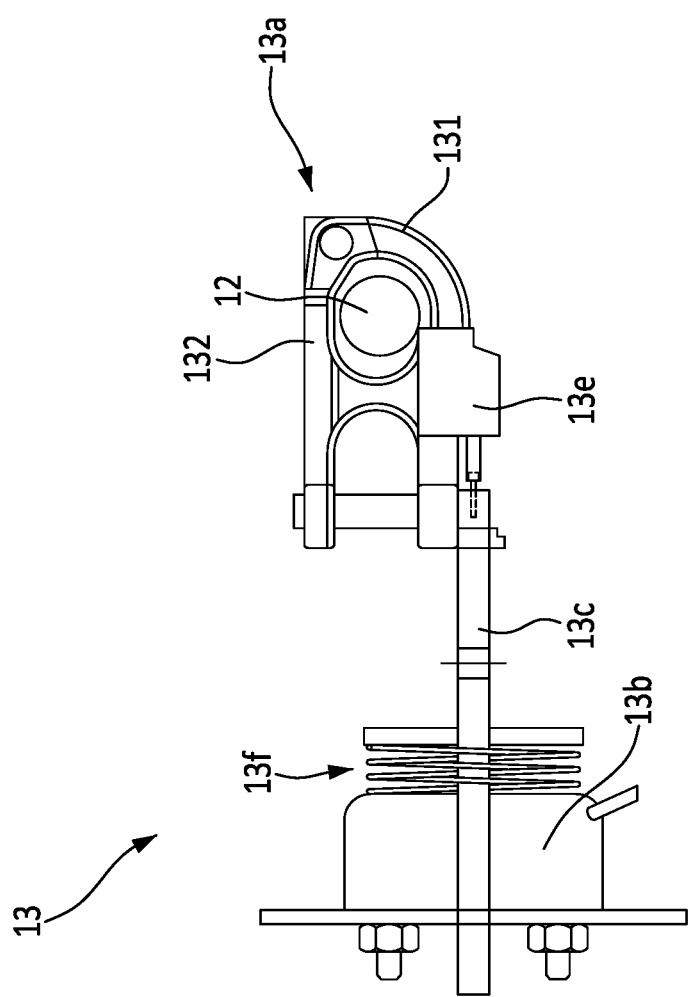
FIG. 9 is side schematic view of a line release mechanism of the submersible buoy of FIGS. 1-3 and 6-8.
Figure 10:
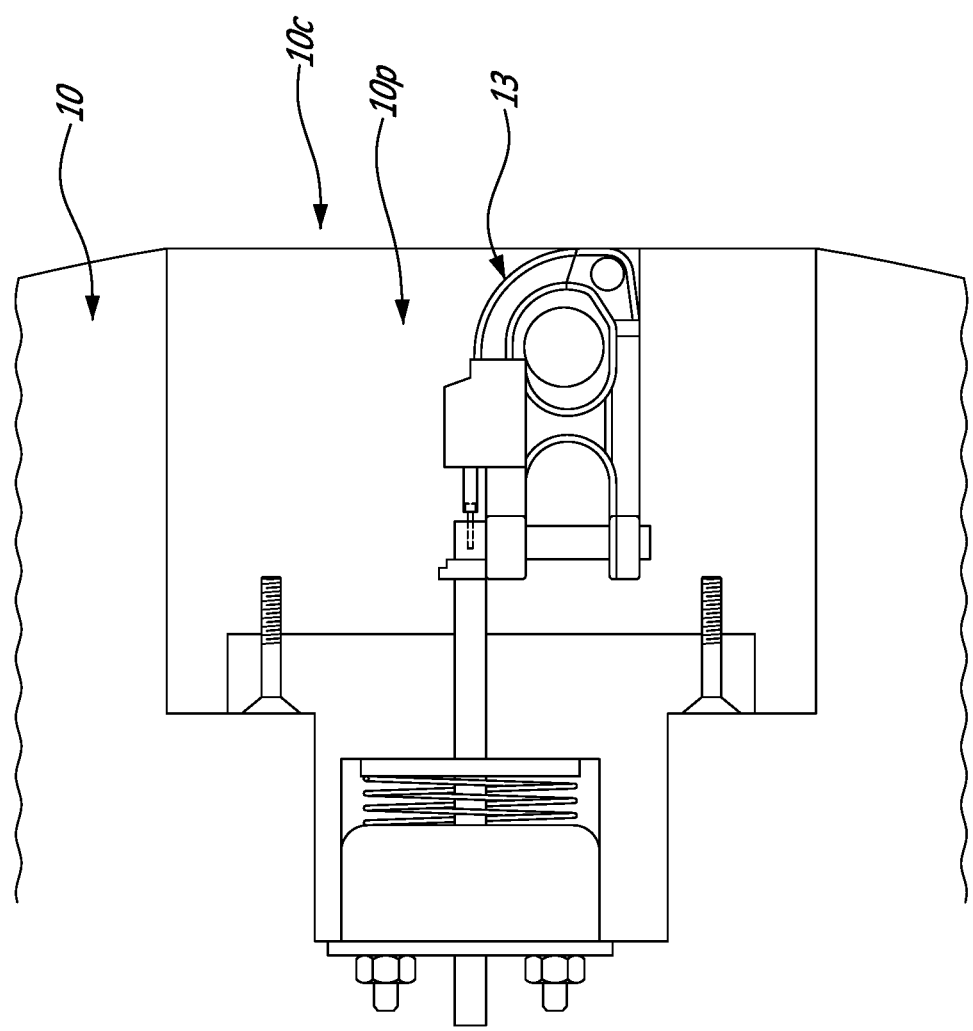
FIG. 10 is a schematic view of the liner release mechanism of FIG. 9 mounted to the submersible buoy of FIGS. 1-3 and 6-8.

FIGS. 9-10 show the line release mechanism 13. The line release mechanism 13 is operable to retain the line 12, and upon actuation, release the line 12. The line release mechanism 13 is operatively linked to the controller unit 200 which will be discussed later hereinbelow. The line release mechanism 13 may be activated by the controller unit 200. The line release mechanism 13 may advantageously only require a small amount of power to operate, which may be stored within the buoy 1. The buoy 1 may stay submerged and not connected to any wired power source external to the buoy 1.

The line release mechanism 13 includes a retention device 13a. The retention device 13a is operable between a closed position and a released position. In the closed position, the retention device 13a may retain the line 12 to prevent or limit unwinding of the line 12 from the central body 11. In the released position, the retention device 13a may release the line 12. When the buoy 1 is submerged, the release of the line 12 by the retention device 13a may cause a rotation of the buoy 1 to reach its unwinding orientation, as described herein. In the embodiment shown, the retention device 13a includes a hook 13b. The hook 13b engages the line 12 in the close position. The hook 13b includes a first hook member 131 movable relative to a second hook member 132 between the closed position and the released position. The first hook member 131 and the second hook member 132 may engage the line 12 in the closed position. In the embodiment shown, the first hook member 131 is pivotally mounted to the second hook member 132. The line 12 is looped in the retention device 13a. The segment of the line 12 extending from the central body 11 and passing through the slot 17 (FIG. 8) then loops in the retention device 13a, between the hook members 131,132. When the buoy 1 is submerged and attached to a submerged object 20 as discussed herein, a residual tension is maintained in the line 12 looped in the retention device 13a at least as a result of the effect of buoyancy pulling the buoy 1 upwardly.

The line release mechanism 13 includes an actuator 13b which is connected to the retention device 13a. In the embodiment shown, the actuator 13b is coupled to the retention device 13a via a pull shaft or rod 13c. The actuator 13b may be coupled to the rod 13c via a coupling. In an embodiment, such coupling is made of an electrically insulated material, though such a material is optional. In an embodiment, the rod 13c is made of an insulated material, whether or not the coupling is. This may limit corrosion propagation in the release mechanism 13 and/or to the actuator 13b. For example, in an embodiment, the rod 13c is in polyoxymethylene (POM). Other electrically insulated material, such as other plastic material may be contemplated.

In the depicted embodiment, the actuator 13b is a linear actuator 13b, whereby an axial force may be generated by the actuator to pull on the rod 13c. In an embodiment, such as shown, the actuator 13b includes a solenoid, which may be a short stroke solenoid actuator. Upon receiving an electric pulse signal (e.g. a few milliseconds pulse) a force induced by the actuator 13b to the retention device 13a causes an actuation of the retention device 13b so as to gain the released position. As shown the force induced by the actuator 13b is transmitted to the retention device 13a via the rod 13c. The actuator 13b may pull on the rod 13c, which in turn may pull on a lock pin 13e (e.g., ring release) of the hook 13a to allow movement of the first hook member 131, and release it from the closed position.

In the embodiment shown, the actuator 13b is biased towards an initial state. As shown, the actuator 13b includes a biasing member 13f, which may be a spring in an embodiment. The biasing member 13b may be referred to as a push back spring in at least some embodiments. Upon activation of the actuator 13b, the biasing member 13f is compressed. After the instant activation of the actuator 13b, the biasing member 13f in the compressed state may force the actuator 13b to recover its initial state. After the instant activation of the actuator 13b to release the line 12, the retention device 13a may returned (forcedly) into the closed position, remain "floating" in between, or blocked into the released position, depending on the embodiments.

Figure 11B:
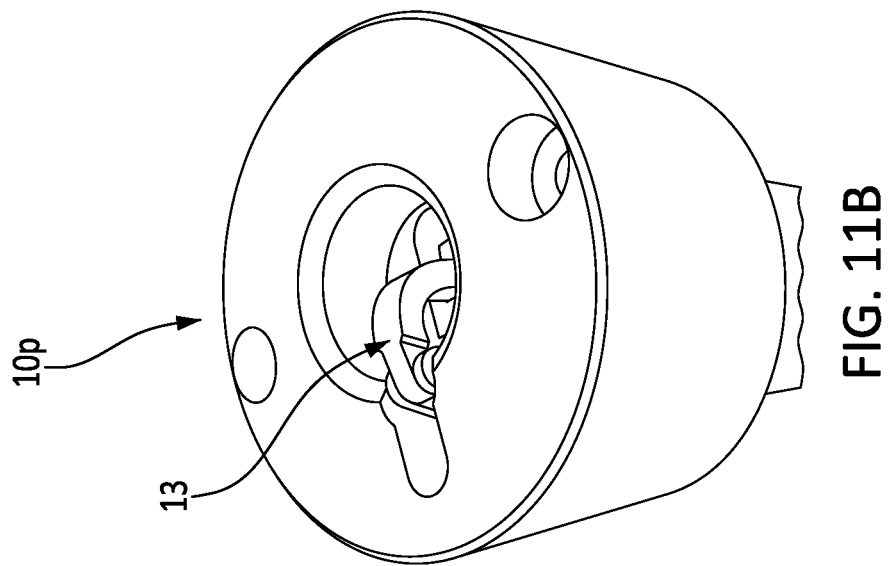
FIGS. 11A-11B are perspective views of a cap of the submersible buoy of FIGS.
Figure 11A:
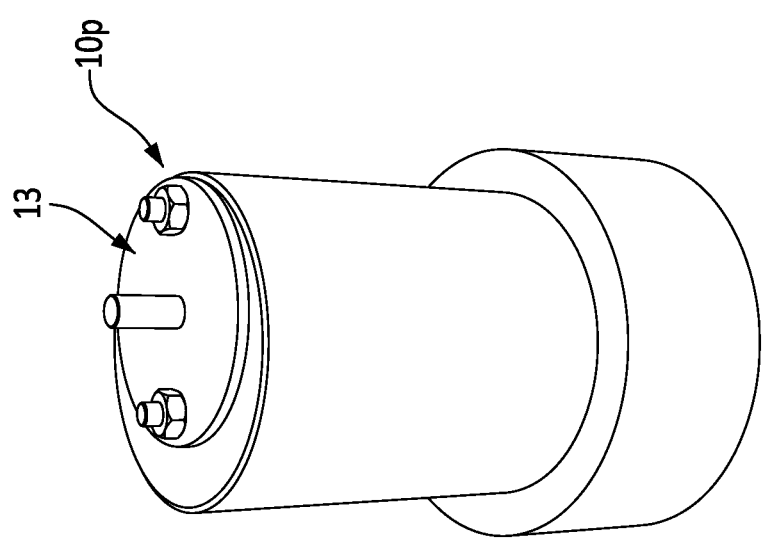

As shown in FIGS. 10, 11A-11B, the line release mechanism 13 may be mounted within a cap 10p. The cap 10p may mate with the opening 10c of one of the floater units 10. The cap 10p may be sealingly engaged within the countersunk hole of the floater unit 10. The cap 10p may be secured to the floater unit 10 and/or the central body 11 in various suitable ways, including by fasteners, treading engagement, or other suitable ways. The cap 10p may be cylindrical, or otherwise have a shape that is complementary with the countersunk hole of the floater unit 10. The cap 10p may be a single part component or have a plurality of parts, as shown. The plurality of parts, as shown, are secured together with fasteners. This is only an example, as they could be secured by adhesives, interlocking, or treading, for example.

Figure 12:
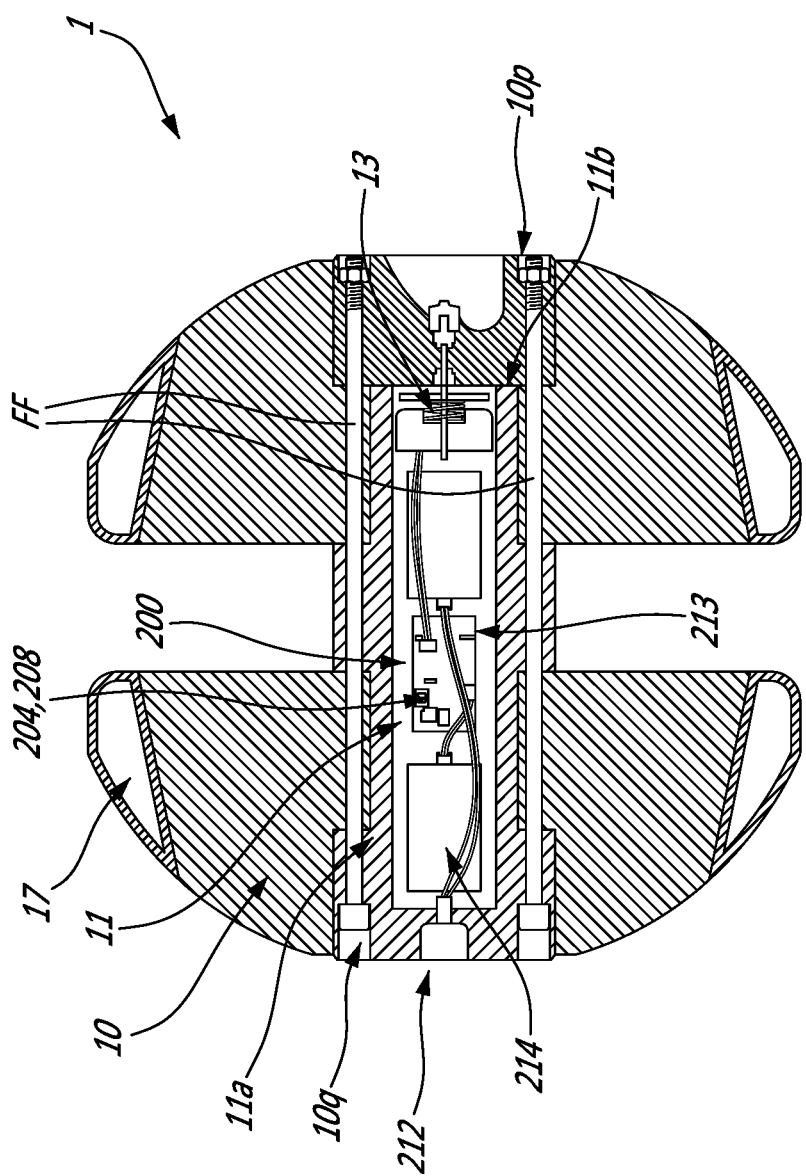
FIG. 12 is a schematic cross—sectional view of the submersible buoy of FIGS. 6-8.

Referring to FIG. 12, a cross-section of the submersible buoy 1 taken along the central axis 14a is shown. The line release mechanism 13 is enclosed at least partially within the central body 11, at an end thereof. Components of the controller unit 200 are enclosed within the central body 11.

Figure 13:
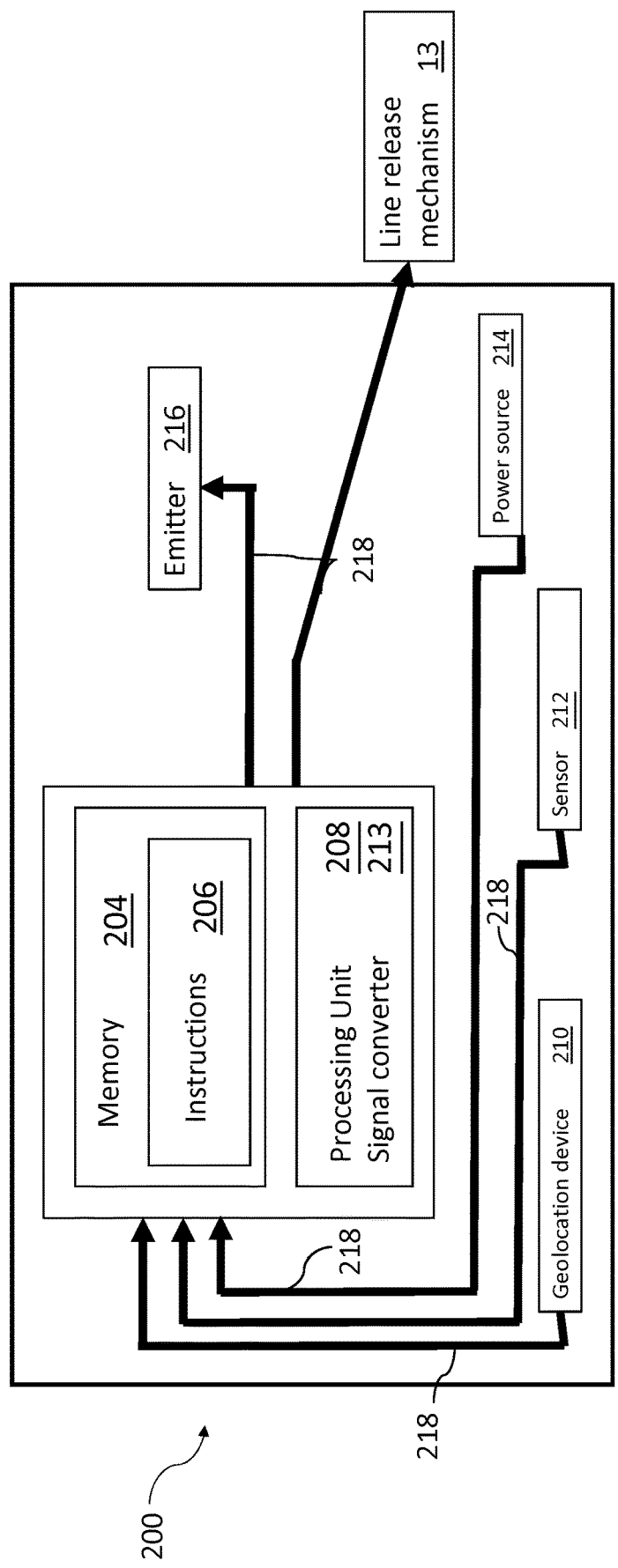
FIG. 13 is a block diagram illustrating a controller unit of the submersible buoy of FIGS. 1-3 and 6-8.

FIG. 13 is a schematic representation of the controller unit 200. The controller unit 200 may include a processing unit 208 and a memory 204 which has stored therein computer-executable instructions 206. The memory 204 may also store other relevant information for the operation/use of the buoy 1. The processing unit 208 may include any suitable device configured to implement the functionality of the controller unit 200 such that instructions 206, when executed by the processing unit 208 or other programmable apparatus, may cause at least some of the functions/acts/steps described herein. The processing unit 208 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof. The controller unit 200 may further comprise a memory 204 which may include any suitable known or other machine-readable storage medium. The memory 204 may comprise non-transitory computer readable storage medium, for example, but not limited to, an electronic, magnetic, optical, electromagnetic, infrared, or semiconductor system, apparatus, or device, or any suitable combination of the foregoing. The memory 204 may include a suitable combination of any type of computer memory, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. The memory 204 may comprise any storage means (e.g., devices) suitable for retrievably storing machine-readable instructions 206 executable by processing unit 208.

The controller unit 200 includes a power source 214. The power source 214 is enclosed within the central body 11. The power source 214 may supply power to one or more components of the controller unit 200 and the line release mechanism 13. A single power source 214 may be shared by many components. Some components requiring power may have their dedicated/independent power source. In the embodiment shown, the power source 214 includes a battery or battery pack (e.g., single use battery or rechargeable battery).

In an embodiment, the power source 214 is in communication with the processing unit 208 to provide a signal indicative of the remaining power level of the power source 214. In one configuration, the controller unit 200 may receive periodically a signal that indicates the remaining power level in the power source 214. The communication lines 218 may be wired electronic connections or wireless connections. The power source 214 may supply power to the processing unit 208 and other components of the controller unit 200. The controller unit 200 includes a sensor 212. The sensor 212 is adapted to receive a signal from a remote controller, which will be described later. The signal may be an instruction signal indicative of a desired change of state of the buoy 1 or the line release mechanism 13. The sensor 212 is linked to the controller unit 202 to relay the signal for processing and further execution of applicable steps/activations based on the signal. Non-limitative examples of the sensor 212 include acoustic receivers, also known as "aquaphone", and electromagnetic receivers. In an embodiment, the sensor 212 is linked to a signal converter 213, also known as a modem or modem module. The signal converter 213 may be powered by the power source 214. The signal converted 213 may convert an acoustic or digital signal into a numeric format for further processing within the processing unit 208.

In some embodiments, the controller unit 200 may include a geolocation device 210 such as a GPS. The geolocation device 210 may be coupled to the controller unit 200 to provide signals indicative of or corresponding to geolocation data to the controller unit 200. The controller unit 200, for instance via the microprocessor 208, may process that information and in response provide instructions to a signal emitter 216 to emit a geolocation signal. In some embodiments, the submersible buoy 1 may be "pinged" in order to locate it. For example, a remote controller may send a "ping" signal to obtain in response a geolocation signal from the submersible buoy 1. The sensor 212 may detect the ping signal and relay it to the controller unit 200, e.g. the processing unit 208 and/or the signal converter 213, which instructs the signal emitter 216 to emit a geolocation signal indicative of the location of the submersible buoy 1. In at least some embodiments, the signal emitter 216 is combined with the sensor 212. Stated otherwise, the sensor 212 may be bidirectional, so as to receive and transmit signals.

Returning to FIG. 12, the sensor 212 is located at an end of the buoy 1. As shown, the sensor 212 is located at the end opposite that of the line release mechanism 13. It may be desired to distance the sensor 212 from metallic components of the controller unit 200 and/or line release mechanism 13. Proximity with metallic components may affect the reception quality of a detected signal (e.g., signal noise). The sensor 212 is enclosed within a cap 10q which engages the end 11a of the central body 11 and/or the end of the floater unit 10. The cap 10q may be sealingly engaged to seal the hollowed central body 11.

Figure 14:
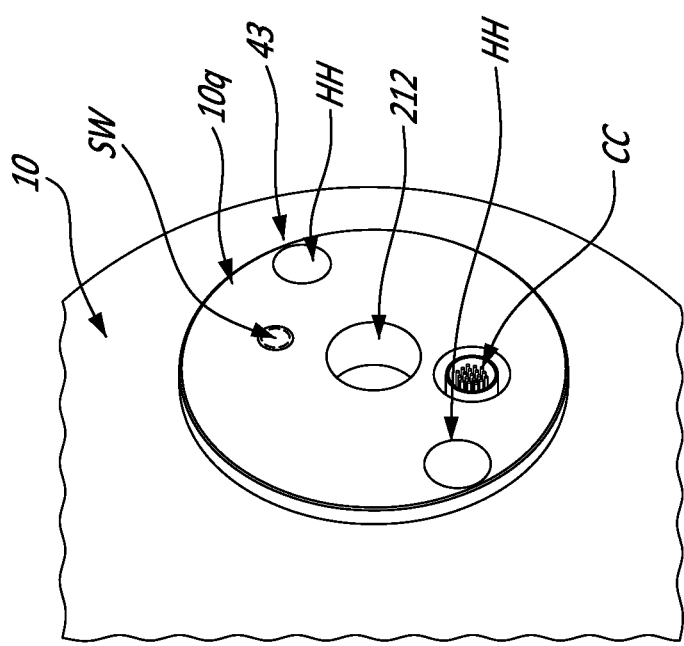
FIG. 14 is a perspective view of an end of the floater unit of FIGS. 4-5.

As shown in FIG. 12 and with additional reference to FIG. 14, the cap 10q may be secured to the floater unit 10. The sensor 212 is inserted into a hole of the cap. The sensor 212 is recessed within the hole, though it could be flush with the outside surface thereof. The cap 10q may define the mounting interface 43 cooperating with the reel system 4, as will be described later. The caps 10p, 10q are both in sealing engagement with the ends 11a, 1b of the central body 11. The caps 10p, 10q may be secured to the central body 11 with fasteners, for example. As shown, in an embodiment, pins FF extend from one cap 10p to the other cap 10q. The pins FF are engaged through holes HH in the caps 10p, 10q. The pins FF extend along the central body 11. The pins FF may pass through the annular wall of the central body 11 (if the annular wall is not of the swivel type, as described above). The pins FF ma be threaded (entirely or partially). The pins may be in threading engagement with nuts or other threaded parts in holes of one of the caps 10p, 10q. Upon tightening, the caps 10p, 10q may be forced axially against the ends 11a, 11b of the central body 11 to thereby seal the sealed compartment housing the components of the controller unit 200. The caps 10p, 10q could be secured independently to the central body 11 and/or to their respective floater units 10 in other embodiments.

As shown in FIG. 14, the cap 10q includes a recess for receiving a switch SW. The switch SW may be sealingly engaged in the recess in at least some embodiments. In an embodiment, the switch SW is a magnetic switch to turn on/off the controller unit 200 of the buoy 1. Actuation of the switch SW may advantageously be contactless, by approaching a magnet in proximity of the switch SW. Other switches turn ON/OFF the controller unit 200 could be contemplated, such as other proximity sensors or push button. The cap 10q includes a connector CC for wire connection of the controller unit 200 to a charging station (for the batteries) and/or wire connection for connection with an external computer or other devices for programming and/or receiving data stored within the controller unit 200. The connector CC can be protected by a plug or connector cap. The connector CC and switch SW could be located elsewhere on the buoy 1, such as on one of the floater units 10, for example.

Figure 15C:
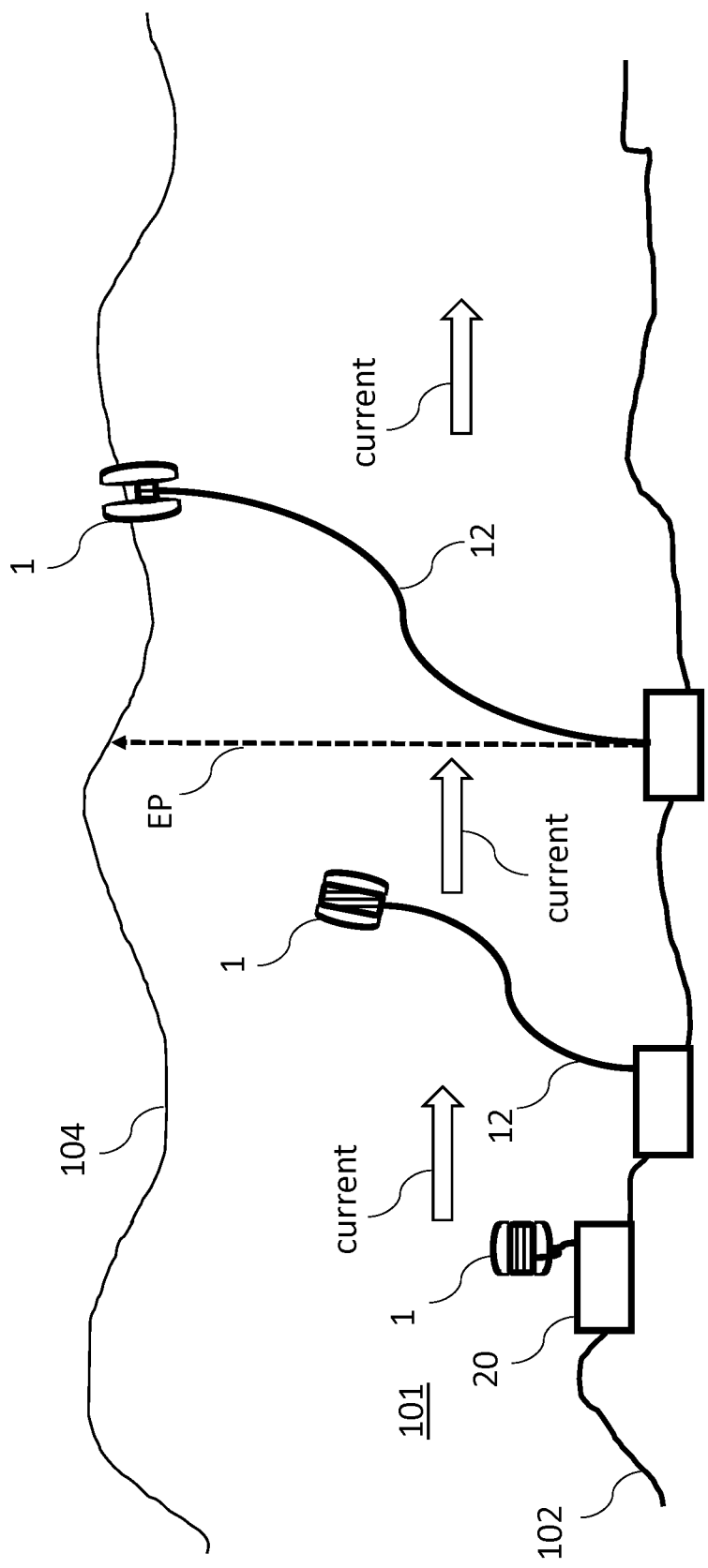
FIG. 15C is a schematic representation of an ascent of a submersible buoy in the presence of a water current, for subsequent retrieval.

Referring to FIGS. 15A-15C, the submersible buoy 1 in underwater operation will now be described. In FIG. 15A, a submersible buoy 1 is shown attached to a submerged object 20, which together form a submerged system 3. The line 12 is attached at an attachment point 21 on the submerged object 20. In FIG. 15A, the submersible buoy 1 has its line release mechanism 13 in the closed position. Because of its buoyancy, the submersible buoy 1 tends to rise in an upright position above the submerged object 20. For example, the submersible buoy 1 may be suspended a few meters above the submerged object 20 depending on the length of the line segment between the attachment point 21 and the retention device 13b on the line 12. Although FIG. 15A shows the submersible buoy 1 in a vertical position, the submersible buoy 1 may move from the vertical position, because of currents and water displacement.

As shown in FIG. 15B, when the line release mechanism 13 releases the line 12, the buoyancy of the submersible buoy 1 induces a rotation until the submersible buoy 1 is substantially perpendicular to the direction of ascension as shown in FIG. 15B. In some cases, the direction of ascension may be parallel to the buoyancy force exerted on the submersible buoy at equilibrium when submerged. The rotation may be completed in less than 10 m, less than 8 m, less than 5 m or less than 3 m of ascension, depending on the embodiments.

The submersible buoy 1 ascends to the surface 104 and the line 12 unwinds as it ascends. FIG. 15C shows a submersible buoy 1 ascending to the surface, with the line 12 unwinding as the submersible buoy 1 ascends. The term "substantially perpendicular" as used herein means that the relationship between two lines on a same plane is generally perpendicular but may oscillate occasionally or sporadically. For example, the term "substantially perpendicular" as used herein may refer to an angle of between 75 to 105 degrees, between 80 to 100 degrees, between 85 to 95 degrees, between 86 to 94 degrees, between 87 to 93 degrees, or between 88 to 92 degrees, the angle being between two lines on a same plane.

In the presence of a maritime current, as illustrated in FIG. 15C, the submersible buoy 1 may not be at equilibrium and drift in the direction of a current. In FIG. 15C, a schematic representation of a submersible buoy 1 ascending to the surface 104 is shown. The submersible buoy 1 drifts in the direction of the current instead of following the equilibrium path EP which is aligned or substantially parallel to the buoyancy force exerted on the submersible buoy 1. Because of the current or other external forces, the submersible buoy 1 may tilt (middle buoy of FIG. 15C), in such embodiments the central axis 14a of the submersible buoy 1 may not be perpendicular to the buoyancy force. In other words, the central axis 14a, may not be parallel to the surface 104. However, in such cases the central axis 14a may not substantially wobble. In further embodiments, the submersible buoy 1 does not oscillate on itself. Accordingly, the floater units 10, in some embodiments, do not reach an angle of more than 80 degree with respect to the normal. The normal can be defined as the central axis 14a at equilibrium. The submersible buoy 1, in at least some cases, may unwind the line 12 continuously and without interruptions.

Figure 16:
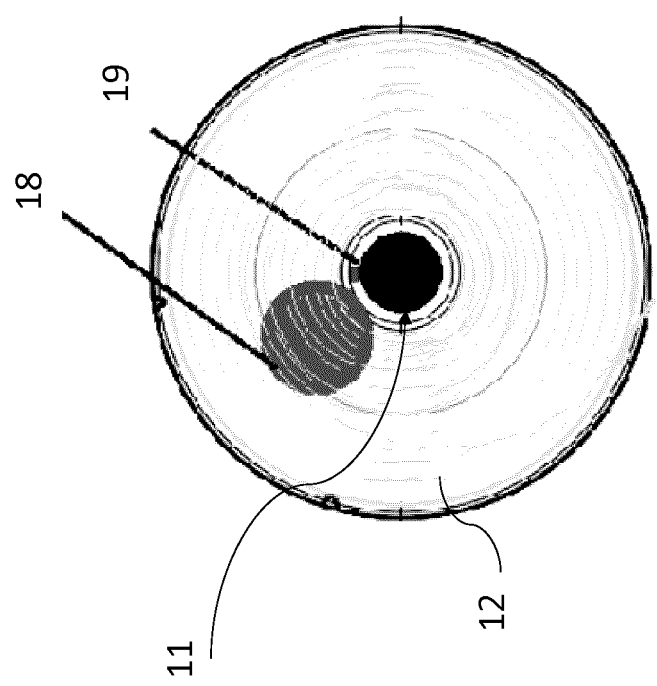
FIG. 16 is a cross-sectional view of the submersible boys of FIGS. 1-3 and 6-8 taken normally to a central axis thereof.
Figure 19:
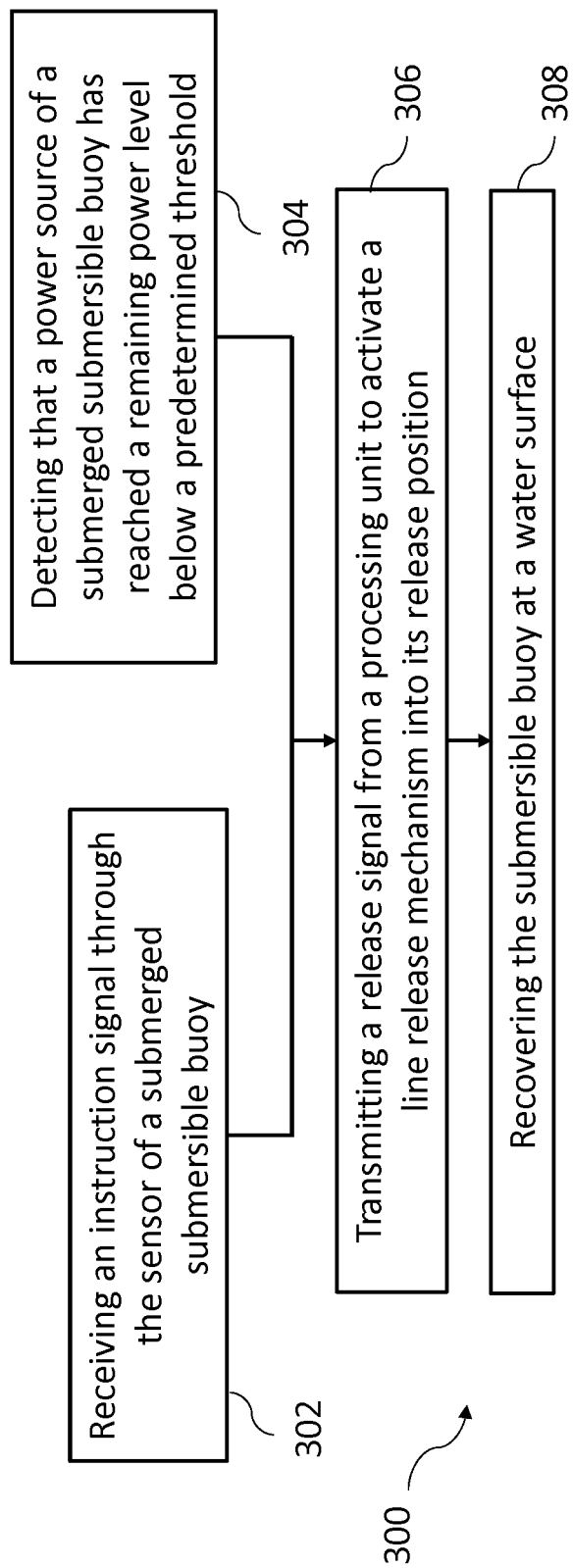
FIG. 19 is a flow diagram of a method of recovering a submerged object in accordance with the present disclosure.

Turning to FIG. 16, a cross section at the central portion 11 is shown with the line 12 wrapped around the central portion 11a. FIG. 16 illustrates that in some embodiments, the line 12 may wrap around an external floater 18 which may or may not be connected to the submersible buoy 1 or to the line 12. For example, the optional external floater 18 may be simply held in place by the line 12 wrapping around it. The external floater 18 may facilitate the rewinding and/or unwinding of the line 12 around the central body 11. In some embodiments, the external floater 18 is attached to the central body 11 but held in place by the line 12. The external floater 18 may assist in determining the direction of the wind when at the surface 104 or the direction of the current when submerged with the line 12 partially unwind and the external floater 18 facing the current. FIG. 16 also illustrates a keyway structure 19 which is interlockingly engaged between the floater and the central body 11. The keyway structure 19 may limit or prevent the floater units 10 from moving out of their respective positions with respect to the central axis 14a.

FIG. 17 illustrates a reel system 4 according to an embodiment. As shown, the submersible buoy 1 is mountable to the reel system 4. The reel system 4 is adapted to rewind the line 12 onto the buoy 1 as the line 12 is reeled-in. In operation, the reel system 4 may wind the line 12 onto the submersible buoy 1. Winding the line 12 onto the buoy 1 and retrieval of the sunk object 20 may be made simultaneously. As such, as the object 20 is retrieved, the buoy 1 may already be ready for a subsequent use cycle.

The reel system 4 includes a mounting interface 42 for engaging with a corresponding mounting interface 43 on the buoy 1. In an embodiment, the mounting interface 42 of the reel system 4 may include pins, as shown, for engaging into holes of the mounting interface 43 of the buoy 1. This may be the other way around in other embodiments. Other configurations of the mounting interface may be contemplated, such as other interlocking features or couplings, such as male female couplings.

In the embodiment shown, the buoy 1 is mounted in a cantilevered fashion to the reel system 4. As shown, the reel system 4 has a single mounting interface 42. The buoy 1 extends from the mounting interface 42 and is not supported on an opposite side of the buoy 1. The reel system 4 may have a dual (or more) mounting interface configuration in some variants, as will be discussed hereinbelow.

The reel system 4 includes a motor 40. In an embodiment, the motor 40 is a hydraulic motor. Other types of motors may be contemplated, for example pneumatic, electric, a combination thereof, etc. The motor 40 may be in driving engagement with the mounting interface 42, directly or indirectly, such as via intermediary parts and/or a transmission, for example, of the reel system 4. Stated otherwise, the motor 40 may drive the mounting interface 42 of the reel system 4 for rotation about a rotational axis RR. As shown, the rotational axis RR coincides with a central axis of the central body 11 of the buoy 1. The motor 40 is mounted onto a frame 41 of the reel system 4. The frame 41, also referred to as a base, may include more than one parts and be defined as a frame assembly, with a plurality of frame members. The frame 41 may be mounted to a structure of the boat. The frame 41 may be secured to the hull, floor, or other parts of the boat. Fasteners, such as bolts and nuts, or other securing means may be contemplated, such as welds, adhesives, to secure the frame 41 of the reel system 4 to the boat. In an embodiment, the reel system 4 may be removably secured to a structure of the boat. In other embodiments, the reel system 4 may be displaceable. For example, the reel system 4 may include rolling elements to roll the reel system 4 on the boat. Having a displaceable/removable reel system 4 may provide more versatility to position the reel system 4 in a location where it is not cumbersome and/or to store it on or off the boat when not in use or for maintenance. In an embodiment, the rotational axis RR is horizontal. As such, the buoy 1 may have its central axis 14b extending horizontally (±15 degrees) when the buoy 1 is mounted onto the mounting interface 42. The rotational axis RR may be vertical or oriented at an angle in other embodiments.

In a variant as shown in FIG. 18, the reel system 4' may have a plurality of mounting interfaces 42, which may provide more stability to the buoy 1 mounted thereto while rotating. As shown in FIG. 18, in some variants, the reel system 4' includes two mounting interfaces 42 for mounting the buoy 1 to the reel system 4'. The mounting interfaces 42 are located on opposite sides of the buoy 1. Mounting the buoy 1 on both sides may limit a wobble of the buoy 1 during winding and/or limit undesired bending loads on the central body 11 of the buoy 1 when supported, with the line 12 taut during winding of the line 12.

The plurality of mounting interfaces 42 may have the same or a distinct configuration depending on the embodiment. For example, a first one of the mounting interfaces 42 may include pins engaged into corresponding holes on the first one of the floater units 10 to impart rotation to the buoy 1 during winding. A second one of the mounting interfaces 42 on an opposite side of the buoy 1 may have a cup shape or flat surface for engagement (mating of contacting) with the second one of the floater units 10. The second mounting interface 42 may apply a compression load onto the buoy 1 in a direction towards the first mounting interface 42. Such a dual support of the buoy 1 may stabilize the buoy 1 during the winding and/or limit wobbling. The buoy 1 may be "clamped" between the first and second mounting interfaces 42. As shown, a clamping (or "tightening") mechanism 44 of the reel system 4' may be operated so as to clamp the buoy 1 between the mounting interfaces 42. As shown in FIG. 18A, the clamping mechanism 44 may include an actuator 45, which my be a lever or other types of actuator, moving the mounting interface 42 towards the mounting interface 43 of the buoy 1 upon actuation. In another embodiment, as shown in FIG. 18B, the clamping mechanism 44 may include a threaded rod TR or other tightening means, which may be adjusted/operated to as to tighten the mounting interface 42 onto the mounting interface 43 of the buoy 1. Stated otherwise, the mounting interface 42 (at least one thereof), may be displaceable between a first position and a second position relative to the mounting interface 43 of the buoy 1, whereby, in the first position, the mounting interface 42 may not engage the mounting interface 43 of the buoy 1 and in the second position, the mounting interface 42 of the reel system 4' may engage the mounting interface 43 of the buoy 1. The clamping mechanism 44 may be operated to secured the buoy 1 on the reel system 4' by axially opposing to the ends of the buoy 1. The buoy 1 may thus be maintained in place on the reel system 4' prior to starting the winding of the line 12 onto the buoy 1.

The buoy 1 may be supported radially. As shown in FIG. 18, the reel system 4' includes a support member 46 for supporting the buoy 1. The support member 46 may limit or prevent wobbling during winding. The support member 46 extends axially along the buoy 1. In an embodiment, as shown, the support member 46 may contact the floater unit(s) 10. The support member 46 may be in rolling engagement with the floater units 10 in al least some embodiments. As shown, the support member 46 may have a rotational axis RS parallel to the rotational axis RR of the buoy 1 mounted on the reel system 4'. The support member 46 could be in sliding engagement with the floater units 10 in other embodiments. The support member 46 may be part of or mounted to the frame 41 of the reel system 4'. In at least some embodiments. the support member 46 may remain fixed relative to the buoy 1 mounted to the reel system 4', though it could be removable from the reel system 4' in some cases. The support member 46 may include rolling elements, such as rollers or wheels in rolling engagement with the buoy 1, in at least some embodiments.

According to the disclosure, in some embodiments, the submersible buoy 1 has a dual role in the method of recovering a submerged object. The submersible buoy may be used to locate the submerged object and retrieve the submerged object 20. Maritime operation, e.g. fishing or research, may thus be more time efficient.

In some exemplary embodiments, a monitoring device (e.g. camera) may be submerged along with the submersible buoy 1. The monitoring device may be coupled to the processing unit 208 and may communicate with the processing unit 208. The monitoring device can be used to monitor the submerged object from the surface. For example, a camera may be employed to monitor fishing traps or fishing nets to determine whether the cage or the net is sufficiently full and ready for retrieval.

A method 300 for retrieving a submerged object 20 connected to the submersible buoy 1 is now presented. The submerged object 20 may be any object capable of sinking in a body of water when attached to the submersible buoy 1. The submerged object 20 can be for the fishing industry, for research applications, military applications, and any other industry/application that requires to sink and retrieve an object. Examples of submerged objects 20 include but are not limited to fishing traps, fishing nets, and research instruments and equipment. In some embodiments, the object 20 is submerged at a depth of at least 100 m, at least 150 m, at least 200 m, at least 250 m, or at least 300 m.

Figure 20:
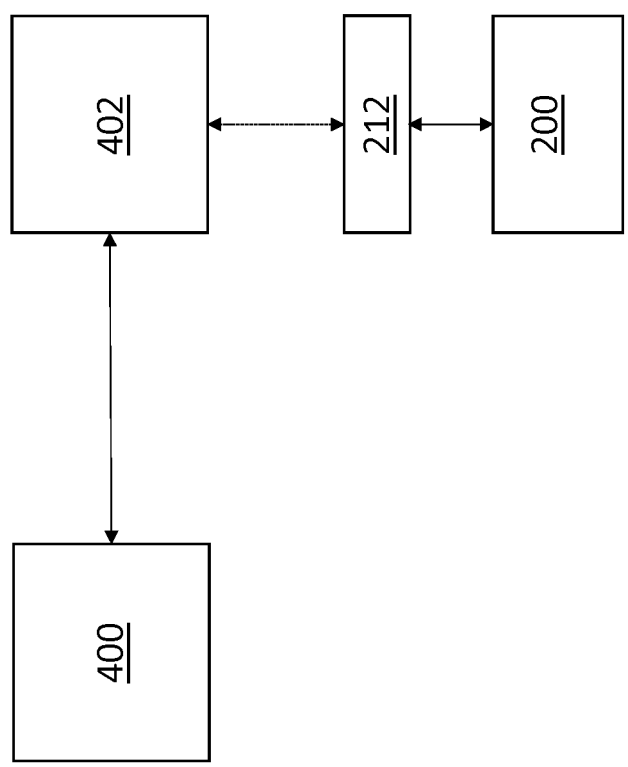
FIG. 20 is a block diagram illustrating a remote controller for remotely controlling the controller unit of FIG. 13.

At step 302, in an embodiment, an instruction signal is received through the sensor 212 of the submersible buoy 1. For example, a remote controller 400 (illustrated at FIG. 20) around or above the surface 104 of the water, may send the instruction signal which may then be received by the sensor 212 of the submersible buoy 1. The remote controller 400 may include any suitable maritime transceiver such as an acoustic or electromagnetic transceiver. For example, the remote controller may be controllable and communicate with a personal computer and/or mobile device (e.g., smart phone), either wired to the remote controller or wireless. In an embodiment, the remote controller 400 includes a transducer 402 which may be submerged. The transducer 402 may emit acoustic signals under water, for example below 40 kHz. The signal emitted by the transducer 402 may trigger the controller unit 200 to cause the submersible buoy 1 to ascend to the surface 104. In one example, the sensor 212 is coupled to the processing unit 208 and the sensor 212 communicates the detected signal emitted by the transducer 402 to the processing unit 208. The processing unit 208 may then process the information for a subsequent step.

Alternatively or in addition to step 302, at step 304, a power level of the power source 214 of the submerged submersible buoy 1 is detected. A signal from the controller unit 200 may be emitted to convey a power level information to the remote controller. In an embodiment the power level information is a remaining power level below a predetermined threshold (e.g., below 15% of remaining power). to have reached a remaining power level below a predetermined threshold. The detection may be performed by the processing unit 208 or by a another device part of the controller unit 200 which may communicate the detection to the processing unit 208. Step 304 may be considered a fail safe to avoid cases where the buoy 1 cannot be activated to ascend to the surface 104 because the power source 214 has reached a critical level and may not supply enough power to the controller unit 200 and/or to deploy the buoy 1 (release the line 12). Therefore, a pre-determined battery threshold may be selected to activate the buoy 1 to ascend to the surface automatically. In some embodiments, after detecting the remaining power level below the predetermined threshold, a distress signal may be emitted to indicate that the submersible buoy 1 has surfaced or is surfacing to the surface 104. The distress signal may be sporadically emitted at a certain interval of time as long as some power remains in the power source 214, in some embodiments.

At step 306, a release signal from the processing unit 208 is transmitted to activate the line release mechanism 13 into its released position. In some embodiments, the release signal is emitted by the processing unit 208 in response to step 302 or step 304. In one embodiment, the processing unit 208 activates the lock pin 10e (e.g., ring release) in the line release mechanism 12 to actuate the retention device 13b (i.e. the released position).

At step 308, the submersible buoy 1 may be recovered at the surface 104 of the water. Once recovered, the submersible buoy 1 may be mounted on a reel system as the reel system 4, 4' described herein to wind the line 12 onto the buoy 1. The line 12 may be engaged to a fishing gurdy, or trawling winch, of the floating vessel 106 to pull the object 20. The line 12 may be simultaneously winded onto the buoy 1. The winding speed of the reel system 4, 4' may be controlled so as to be synchronized with the pulling speed of the fishing gurdy (or winch). Synchronization may be obtained by valves, e.g., solenoid valves of the hydraulic system driving the fishing gurdy, for example. Synchronization could be made electronically, where applicable, in other cases. The motor 40 of the reel system 4, 4' may thus be actuated as a "slave" of the hydraulic fishing gurdy. Stated otherwise, the motor 40 may be part of the same hydraulic system as that of the fishing gurdy and cooperate therewith so as to maintain a tension in the line 12 during the winding onto the buoy 1 while the fishing gurdy reel-in the object 20 via the line 12. As the fishing gurdy pulls the submerged object 20 from the floor 102 until it approaches the surface 104, the reel system 4, 4' may wind the line 12 onto the buoy 1. The submerged object 20 may then be recovered. The submerged object 20 may be on boarded (loaded) onto the floating vessel 106 by the fishing gurdy (or winch) of the floating vessel 106, or manually, for example. Although not practical but potentially necessary in certain research applications, the submerged object 20 may be recovered by a diver.

While the present disclosure has been described in connection with specific embodiments thereof, it will be understood that it is capable of further modifications and this application is intended to cover any variations, uses, or adaptations, including such departures from the present disclosure as come within known or customary practice within the art and as may be applied to the essential features hereinbefore set forth, and as follows in the scope of the appended claims.

What is claimed is:

1. A submersible buoy adapted to be attached to a submersible object via a line, the submersible buoy comprising:
a central body having a first end and a second end axially spaced apart along a central axis extending between the first end and the second end, the central body adapted to have the line wound therearound;
a first floater unit connected to the first end of the central body and having a first buoyancy;
a second floater unit connected to the second end of the central body and having a second buoyancy, the second buoyancy being of a value relative to the first buoyancy such that a total buoyancy force exerted on the submersible buoy, at equilibrium when submerged, is substantially perpendicular to the central axis; and
a line release mechanism including a line retention device operable between a closed position and a released position, the line retention device in the closed position retaining the line to prevent unwinding of the line, the line retention device in the released position releasing the line to allow the line to unwind, the line release mechanism being operatively linked to a controller unit, the controller unit controllable remotely for remote actuation of the line release mechanism from the closed position to the released position.

2. The submersible buoy of claim 1, further comprising the line, wherein the line is attached to the central body.

3. The submersible buoy of claim 2, wherein at least a portion of the line is wound around the central body.

4. The submersible buoy of claim 1, wherein the first floater unit and the second floater unit comprise foam.

5. The submersible buoy of claim 1, wherein the central body is hollowed and encloses the controller unit.

6. The submersible buoy of claim 1, wherein the controller unit includes a power source, a processing unit powered by the power source, and a sensor to detect an underwater acoustic signal.

7. The submersible buoy of claim 1, wherein the controller unit includes a geolocation device.

8. The submersible buoy of claim 1, wherein the central body has a tubular shape, the central body defining a sealed housing closed by caps at opposite ends thereof.

9. The submersible buoy of claim 1, wherein at least one of the first floater unit and the second floater unit includes a line retaining slot on a periphery thereof, the liner retaining slot adapted to catch a segment of the line.

10. The submersible buoy of claim 1, wherein the line release mechanism includes an actuator operatively linked to the controller unit, the actuator connected to the line retention device via a pull rod.

11. The submersible buoy of claim 10, wherein the pull rod is coupled to a ring release of the retention device.

12. The submersible buoy of claim 10, wherein the pull rod is made of an electrically insulated material.

13. The submersible buoy of claim 1, wherein the actuator includes a solenoid coupled to the pull rod.

14. The submersible buoy of claim 1, wherein the actuator includes a linear actuator coupled to the pull rod.

15. The submersible buoy of claim 1, wherein the line retention device includes a hook engaging the line in the closed position.

16. The submersible buoy of claim 15, wherein the hook includes a first hook member movable relative to a second hook member between the closed position and the released position.

17. The submersible buoy of claim 1, wherein the first floater unit and the second floater unit are spaced apart from each other by a gap along the central body, the gap defined between opposing inner surfaces of the first and second floater units, a ratio of a gap dimension DG over a total width WT of the buoy is between 1:2 and 1:8.

18. The submersible buoy of claim 17, wherein the ratio of the gap dimension DG over the total width WT of the buoy is about 1:4.

* * * * *